(12) United States Patent
Wu et al.

(10) Patent No.: US 11,228,905 B2
(45) Date of Patent: *Jan. 18, 2022

(54) SECURITY IMPLEMENTATION METHOD, RELATED APPARATUS, AND SYSTEM

(71) Applicant: Huawei Technologies Co., Ltd., Shenzhen (CN)

(72) Inventors: Rong Wu, Shenzhen (CN); Lu Gan, Shenzhen (CN); Bo Zhang, Shenzhen (CN); Shuaishuai Tan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

This patent is subject to a terminal disclaimer.

(21) Appl. No.: 16/720,673

(22) Filed: Dec. 19, 2019

(65) Prior Publication Data

US 2020/0128403 A1 Apr. 23, 2020

Related U.S. Application Data

(63) Continuation of application No. 16/409,207, filed on May 10, 2019, now Pat. No. 10,728,757, which is a
(Continued)

(30) Foreign Application Priority Data

Jul. 28, 2017 (CN) .......................... 201710633559.1

(51) Int. Cl.
*H04L 29/06* (2006.01)
*H04W 12/041* (2021.01)
(Continued)

(52) U.S. Cl.
CPC ....... *H04W 12/041* (2021.01); *H04W 12/033* (2021.01); *H04W 12/04* (2013.01);
(Continued)

(58) Field of Classification Search
CPC ............. H04W 12/041; H04W 12/033; H04W 12/0431; H04W 12/04; H04W 12/08;
(Continued)

(56) References Cited

U.S. PATENT DOCUMENTS 8,179,860 B2 5/2012 Brusilovsky et al.
9,253,701 B2 2/2016 Cheng et al.
(Continued)

FOREIGN PATENT DOCUMENTS

CN 101257723 A 9/2008
CN 101742498 A 6/2010
(Continued)

OTHER PUBLICATIONS

Kahn et al., "Connectionless access for mobile cellular networks", IEEE Communications Magazine, vol. 53, Issue: 9, September (Year: 2015).*
(Continued)

*Primary Examiner* — Morshed Mehedi
(74) *Attorney, Agent, or Firm* — Conley Rose, P.C.

(57) ABSTRACT

A security implementation method, a related apparatus, and a system, where the method includes receiving, by a first network element, a request for handing over a user equipment from a source access network device to a target access network device to perform communication. The method further includes: obtaining, by the first network element, a security key, where the security key is used for protecting the communication between the user equipment and the target access network device after the user equipment is handed over from the source access network device to the target access network device; and sending, by the first network element, the security key to the target access network device.

20 Claims, 10 Drawing Sheets

Related U.S. Application Data continuation of application No. PCT/CN2018/084702, filed on Apr. 26, 2018.

(51) Int. Cl.
*H04W 36/00* (2009.01)
*H04W 36/08* (2009.01)
*H04W 12/04* (2021.01)
*H04W 12/08* (2021.01)
*H04W 12/06* (2021.01)
*H04W 12/033* (2021.01)
*H04W 12/0431* (2021.01)

(52) U.S. Cl.
CPC ....... *H04W 12/0431* (2021.01); *H04W 12/06* (2013.01); *H04W 12/08* (2013.01); *H04W 36/0038* (2013.01); *H04W 36/08* (2013.01)

(58) Field of Classification Search
CPC . H04W 12/06; H04W 36/0038; H04W 36/08; H04W 36/0033; H04W 12/009
See application file for complete search history.

(56) References Cited

U.S. PATENT DOCUMENTS

| | | | |
|---|---|---|---|
| 10,200,916 | B2 | 2/2019 | Dai et al. |
| 2010/0263021 | A1 | 10/2010 | Arnott et al. |
| 2011/0075675 | A1 | 3/2011 | Koodli et al. |
| 2011/0096660 | A1 | 4/2011 | Ikeda et al. |
| 2011/0231654 | A1 | 9/2011 | Somadder et al. |
| 2012/0164979 | A1 | 6/2012 | Bachmann et al. |
| 2012/0183141 | A1 | 7/2012 | Hapsari et al. |
| 2012/0328103 | A1 | 12/2012 | Feng et al. |
| 2013/0028421 | A1 | 1/2013 | Feng et al. |
| 2013/0059564 | A1 | 3/2013 | Jung et al. |
| 2013/0083726 | A1 | 4/2013 | Jain et al. |
| 2013/0128866 | A1 | 5/2013 | Zhang et al. |
| 2013/0232335 | A1 | 9/2013 | King et al. |
| 2013/0310006 | A1 | 11/2013 | Chen et al. |
| 2015/0026787 | A1 | 1/2015 | Zhang et al. |
| 2015/0127952 | A1 | 5/2015 | Bowman et al. |
| 2016/0006707 | A1 | 1/2016 | Ying et al. |
| 2016/0112207 | A1 | 4/2016 | Horn et al. |
| 2016/0242081 | A1 | 8/2016 | Worrall et al. |
| 2016/0277445 | A1 | 9/2016 | Wager et al. |
| 2017/0078874 | A1* | 3/2017 | Lee ..................... H04W 12/037 |
| 2017/0134996 | A1 | 5/2017 | Wang et al. |
| 2017/0156060 | A1* | 6/2017 | Wu ....................... H04L 9/0861 |
| 2017/0359719 | A1 | 12/2017 | Li et al. |
| 2018/0176710 | A1* | 6/2018 | Jang ..................... H04W 88/10 |
| 2018/0192333 | A1* | 7/2018 | Wu .................... H04W 36/0011 |
| 2018/0199193 | A1 | 7/2018 | Lee et al. |
| 2018/0199242 | A1* | 7/2018 | Deng ................ H04W 36/0038 |
| 2018/0270210 | A1 | 9/2018 | Gan et al. |
| 2019/0141584 | A1 | 5/2019 | Ben Henda et al. |
| 2020/0068645 | A1 | 2/2020 | Chang et al. |
| 2020/0337104 | A1* | 10/2020 | Lehtovirta ............ H04W 12/06 |

FOREIGN PATENT DOCUMENTS

| | | | | |
|---|---|---|---|---|
| CN | 101931953 | A | 12/2010 | |
| CN | 102340772 | A | 2/2012 | |
| CN | 102378168 | A | 3/2012 | |
| CN | 102625300 | A | 8/2012 | |
| CN | 102958052 | A | 3/2013 | |
| CN | 103098432 | A | 5/2013 | |
| CN | 103379490 | A | 10/2013 | |
| CN | 103428787 | A | 12/2013 | |
| CN | 103747442 | A | 4/2014 | |
| CN | 103781069 | A | 5/2014 | |
| CN | 104010305 | A | 8/2014 | |
| CN | 104636679 | | 5/2015 | |
| CN | 104661217 | A | 5/2015 | |
| CN | 104980980 | A | 10/2015 | |
| CN | 105515769 | A | 4/2016 | |
| CN | 105580430 | A | 5/2016 | |
| CN | 106134231 | A | 11/2016 | |
| CN | 106576107 | A | 4/2017 | |
| CN | 106658492 | A | 5/2017 | |
| CN | 106714152 | A | 5/2017 | |
| CN | 106817696 | A | 6/2017 | |
| CN | 106922216 | A | 7/2017 | |
| EP | 2566205 | B1 | 3/2019 | |
| KR | 20110124162 | A | 11/2011 | |
| KR | 20120076898 | A | 7/2012 | |
| KR | 20130016382 | A | 2/2013 | |
| KR | 20180118047 | A * | 10/2018 | ............ H04W 36/36 |
| WO | 2012050841 | A1 | 4/2012 | |
| WO | 2013163815 | A1 | 11/2013 | |
| WO | 2013166607 | A1 | 11/2013 | |
| WO | WO-2013163815 | A1 * | 11/2013 | .......... H04W 12/062 |
| WO | WO-2014013291 | A1 * | 1/2014 | ............ H04W 36/04 |
| WO | 2016166529 | A1 | 10/2016 | |
| WO | 2016196958 | A1 | 12/2016 | |
| WO | WO-2017078657 | A1 * | 5/2017 | ............ H04W 12/04 |
| WO | 2017104858 | A1 | 6/2017 | |

OTHER PUBLICATIONS

Foreign Communication From A Counterpart Application, Chinese Application No. 2018114903223, Chinese Notice of Allowance dated Feb. 21, 2020, 4 pages.
Machine Translation and Abstract of Chinese Publication No. CN103781069, May 7, 2014, 19 pages.
Machine Translation and Abstract of Chinese Publication No. CN105515769, Apr. 20, 2016, 11 pages.
Machine Translation and Abstract of Korean Publication No. KR20120076898, Jul. 10, 2012, 18 pages.
Machine Translation and Absliact of Chinese Publication No. CN102958052, Mar. 6, 2013, 49 pages.
Machine Translation and Abstract of Chinese Publication No. CN104661217, May 27, 2015, 20 pages.
"3rd Generation Partnership Project; Technical Specification Group Services and System Aspects; 3GPP System Architecture Evolution (SAE); Security architecture (Release 15)," 3GPP TS 33.401, V15.0.0, Jun. 2017, 153 pages.
"3rd Generation Partnership Project; Technical Specification Group Services and System Aspects; Security Architecture and Procedures for 5G System (Release 15)," 3GPP TS 33.501, V0.2.0, May 2017, 25 pages.
Boccardi, F., et al., "Why to decouple the uplink and downlink in cellular networks and how to do," IEEE Communications Magazine, vol. 54, No. 3, Mar. 23, 2016, 14 pages.
Chen, et al., "User-centric ultra-dense networks for 5G: challenges, methodologies, and directions," IEEE Wireless Communications, Vo. 23, No. 2, Apr. 2016, pp. 78-85.
Foreign Communication From A Counterpart Application, Chinese Application No. 201811490324.2, Chinese Office Action dated Jun. 18, 2019, 3 pages.
Foreign Communication From A Counterpart Application, Chinese Application No. 201811490324.2, Chinese Search Report dated Jun. 10, 2019, 2 pages.
Foreign Communication From A Counterpart Application, PCT Application No. PCT/CN2018/084702, English Translation of International Search Report dated Jul. 18, 2018, 2 pages.
Foreign Communication From A Counterpart Application, Chinese Application No. 201811490322.3, Chinese Office Action dated Aug. 30, 2019, 10 pages.
Ericsson, "Solution on inter-working handover from 5G Next Gen to EPC using Nx interface," S3-170791, 3GPP TSG SA WG3 (Security) Meeting #86-Bis, Mar. 27-31, 2017, 3 pages.
Nec, "pCR to TR 33.899: Inter AMF, Inter SMF, Inter NG RAN handover without Xn interface" S3-171603 (revision of S3-171182), 3GPP TSG SA WG3 (Security) Meeting #87, May 15-19, 2017, 3 pages.

(56) References Cited

OTHER PUBLICATIONS

Ericsson, et al., "IW HO from 5G to 4G," S3-180959(merger of S3-180708 and S3-180633 and S3-180785), 3GPP TSG SA WG3 (Security) Meeting #90bis, Feb. 26-Mar. 2, 2018, 4 pages.
Foreign Communication From A Counterpart Application, European Application No. 18838161.0, Extended European Search Report dated Dec. 10, 2019, 8 pages.
Chao, X., "Secure Relay Selection and Power Allocation in Cognitive Radio Nerworks," Beijing University of Posts and Telecommunications, 2015, 1 page.
Lee, Y., et al., "A Technology Mining Framework in Developing New Wireless Services" Korean Management Science Review, vol. 26 Issue 3, Nov. 30, 2009, 15 pages.
3GPP TR 23.799 V1.2.1, "3rd Generation Partnership Project; Technical Specification Group Services and System Aspects; Study on Architecture for Next Generation System (Release 14)," Nov. 2016, 526 pages.
Chen, Xin., et al., "A New Handover Authentication Protocol for LTE-A Network," Acta Electronica Sinica, vol. 45, No. 2, Feb. 15, 2017, 7 pages.
Norrman, K., et al., "Protecting IMSI and User Privacy in 5G Networks," Published in MobiMedia, Computer Science, Dec. 31, 2016, 8 pages.
Zeng, M., et al., "Research Progress on 5G Communication Security," Communications Technology, vol. 50, No. 4, Apr. 10, 2017, 6 pages.
Huawei, "Update of 4G to SG interworking handover with Nx interface," S2-175311, SA WG2 Meeting #122, Jun. 26-30, 2017, Cabo, Mexico, 10 pages.

\* cited by examiner

SECURITY IMPLEMENTATION METHOD, RELATED APPARATUS, AND SYSTEM

CROSS-REFERENCE TO RELATED APPLICATIONS

This application is a continuation of U.S. patent application Ser. No. 16/409,207, filed on May 10, 2019, which is a continuation of International Patent Application No. PCT/CN2018/084702, filed on Apr. 26, 2018, which claims priority to Chinese Patent Application No. 201710633559.1, filed on Jul. 28, 2017. The disclosures of the aforementioned applications are hereby incorporated by reference in their entireties.

TECHNICAL FIELD

This application relates to the field of communications technologies, and in particular, to a security implementation method, a related apparatus, and a system.

BACKGROUND

At present, user equipments (such as mobile phones) have been widely used, greatly facilitating people's life. A user equipment may directly establish a communication connection to a base station, to perform communication and provide a user with rich communication experience using a data transmission service provided by a network. In some application scenarios, if user equipment moves from a cell of a base station to a cell of a current base station, a network connection of the user equipment needs to be handed over from the original base station to the current base station before communication can continue to be maintained.

For a future mobile communication architecture (such as a fifth generation (5G) communications system), a network also needs to satisfy a handover requirement of user equipment. Currently, in an existing 3rd Generation Partnership Project (3GPP) standard for mobile communication, an SA2 architecture group has proposed a rough architecture of a 5G network. In this architecture, an access management function (AMF) of a core network is usually deployed in a location relatively close to a base station. Therefore, when user equipment hands over between base stations for communication, inter-AMF handover may also be caused.

However, a current communication security implementation method (an Extensible Authentication Protocol (EAP) method) is not applicable to security protection for inter-AMF handover in a 5G network. Therefore, how to establish a security mechanism based on a future mobile communication architecture becomes a problem that currently needs to be urgently resolved.

SUMMARY

Embodiments of the present disclosure provide a security implementation method, a related apparatus, and a system, to implement security protection in an inter-AMF handover scenario, improve security of a future mobile communication architecture, and satisfy a user requirement.

According to a first aspect, an embodiment of the present disclosure discloses a security implementation method. The method includes receiving, by a first network element, a request for handing over a user equipment from a source access network device to a target access network device to perform communication; and obtaining, by the first network element, a security key, where the security key is used for protecting the communication between the user equipment and a target network after the user equipment is handed over from the source access network device to the target access network device, where the target network includes the target access network device and a target core network device, and the target core network device includes the first network element. The method further includes sending, by the first network element, the security key to the target access network device.

A second network element is connected to the source access network device, and the second network element and the source access network device are network devices on a source side. The first network element is connected to the target access network device, and the first network element and the target access network device are network devices on a target side.

In some implementations, the second network element may be a network device such as a source AMF, a source security anchor function (SEAF), or a source Session Management Function (SMF), and the first network element is a corresponding network device such as a target AMF, a target SEAF, or a target SMF.

The request may carry a security context of the source side. For example, the security context of the source side may include one or more of a key lifetime, a key index, a security capability of UE, an integrity algorithm, an integrity algorithm identifier, an encryption algorithm, an encryption algorithm identifier, or a counter related to key calculation. For example, the request may be a handover request, a path switching request, or the like.

In this embodiment of the present disclosure, obtaining, by the first network element, a security key includes: obtaining, by the first network element, a first intermediate key, where the first intermediate key is an upper-layer key generated after authentication, and is used for deriving a lower-layer access stratum (AS) key and a lower-layer non-access stratum (NAS) key; determining, by the first network element, a security protection algorithm; and deriving the security key based on the security protection algorithm and the first intermediate key.

The security key may include an AS key and an NAS key. The AS key is used for protecting communication between the user equipment and an access network device, and the NAS key is used for protecting communication between the user equipment and a core network device (such as an AMF/SEAF/SMF).

The first network element may obtain the first intermediate key in various manners.

In an embodiment, the first network element obtains the first intermediate key that is derived by the second network element based on a second intermediate key and a network parameter. The second intermediate key is an upper-layer key generated after authentication, and is used for deriving a lower-layer access stratum key and a lower-layer non-access stratum key. For example, the second intermediate key is a key Kamf that originally exists in the second network element, and the key Kamf is obtained by the second network element when the authentication succeeds.

In an embodiment, the first network element receives the second intermediate key sent by the second network element; and the first network element derives the first intermediate key based on the second intermediate key and a network parameter.

In an embodiment, after the user equipment is handed over from the source access network device to the target access network device, and two-way authentication on the user equipment succeeds again, the first network element obtains an anchor key Kseaf. Additionally, the first network element derives the first intermediate key based on the anchor key and a network parameter.

The network parameter may include one or more of a target side identifier, a slice identifier, a network access identifier (NAI), network slice selection assistance information (NSSAI), an AMF region identifier, an AMF setting identifier, a globally unique AMF identifier (GUAMI), an AMF pointer, an AMF set identifier, a count value Nonce, a counter, a random number, or a sequence number.

In an embodiment of the present disclosure, the first network element may further obtain a next hop key, namely, a first Next Hop (NH), and a next hop chaining counter (NCC), namely, a first NCC, where the first NH and the first NCC are sent by the second network element. The first network element may obtain a pair of {second NH, second NCC} based on a pair of {first NH, first NCC}. In a subsequent step, the first network element may send the pair of {second NH, second NCC}, a second key, and a third key to the target access network device, and the target access network device generates a first key based on the pair of {second NH, second NCC}.

In an embodiment, the security key includes the first key, the second key, and the third key, where the first key is an intermediate key for security protection between user equipment and the target access network device, the second key is an NAS signaling encryption protection key, and the third key is an NAS signaling integrity protection key.

Determining, by the first network element, a security protection algorithm, and deriving the security key based on the security protection algorithm and the first intermediate key may comprise: including, by the security protection algorithm, an NAS confidentiality algorithm identifier and an NAS integrity algorithm identifier; deriving, by the first network element, the first key such as a key KgNB based on a first parameter, where the first parameter includes one or more of the first intermediate key, a target cell identifier, a frequency channel number, an NAS count value, an NAS connection identifier, a counter, a random number, or a sequence number; deriving, by the first network element, the second key such as a key Knasenc based on a second parameter, where the second parameter includes one or more of the first intermediate key, the NAS confidentiality algorithm identifier, a counter, a random number, or a sequence number; and deriving, by the first network element, the third key such as Knasint based on a third parameter, where the third parameter includes one or more of the first intermediate key, the NAS integrity algorithm identifier, a counter, a random number, or a sequence number.

Sending, by the first network element, the security key to the target access network device may comprise sending, by the first network element, the first key to the target access network device.

In an embodiment, the source access network device is an access network device in a first communications system, the target access network device is an access network device in a second communications system, and the first network element is a network element in the second communications system. The request may include a security context of the first communications system, and a third intermediate key. The third intermediate key may comprise an upper-layer key generated after authentication in the first communications system, and is used for deriving a lower-layer access stratum key and a lower-layer non-access stratum key.

The obtaining, by the first network element, a first intermediate key may include deriving, by the first network element, the first intermediate key based on the security context of the first communications system, a security context of the second communications system, and the third intermediate key.

In an embodiment, the first network element may include a target access and mobility management function (AMF), the second network element may include a source AMF, where the target AMF is connected to the target access network device the source AMF is connected to the source access network device. Alternatively, the first network element may include a target security anchor function (SEAF), the second network element may include a source SEAF, where the target SEAF is connected to the target access network device and the source SEAF is connected to the source access network device.

In an embodiment, the network parameter includes one or more of a target side identifier, a slice identifier, a network access identifier (NAI), network slice selection assistance information (NSSAI), an AMF region identifier, an AMF setting identifier, a globally unique AMF identifier (GUAMI), an AMF pointer, an AMF set identifier, a counter, a random number, or a sequence number.

In an embodiment, the first network element includes a mobility management entity (MME) network element in a first communications system, the target access network device is an access network device in the first communications system, and the source access network device is an access network device in a second communications system.

Further, the MME may receive the request for handing over the user equipment from the source access network device to the target access network device to perform communication, where the request includes a security context of the second communications system. The MME may obtain the security key, where the security key is used for protecting the communication between the user equipment and the target access network device after the user equipment is handed over from the source access network device to the target access network device. Additionally, the MME may send the security key to the target access network device.

In an embodiment, the MME obtains a third intermediate key, where the third immediate key is derived by a home subscriber server (HSS) in the first communications system based on a first ciphering key, a first integrity protection key, a serving network name identifier, and a sequence number SQN. The third intermediate key may comprise an upper-layer key generated after authentication in the first communications system, and is used for deriving a lower-layer access stratum key and a lower-layer non-access stratum key. The MME may derive the security key based on the security context of the second communications system and the third intermediate key.

In an embodiment, the MME obtains a first intermediate key sent by an AMF in the second communications system, where the first intermediate key is an upper-layer key generated after authentication in the second communications system, and is used for deriving a lower-layer access stratum (AS) key and a lower-layer non-access stratum (NAS) key. The MME may derive the third intermediate key based on the first intermediate key, and the MME may derive the security key based on the security context of the second communications system and the third intermediate key.

According to a second aspect, an embodiment of the present disclosure provides a security implementation method including: receiving, by a target access network device, a request for handing over a user equipment from a source wireless node to a target wireless node to perform communication; and receiving, by the target access network device, a first key sent by a core network device, where the first key is an intermediate key for security protection between the user equipment and the target access network device. The method further includes: generating, by the target access network device, a second key based on the intermediate key, where the second key is an intermediate key for security protection between the user equipment and the target wireless node; and sending, by the target access network device, the second key to the target wireless node, such that the target wireless node generates a security key based on the second key, where the security key is used for protecting the communication between the user equipment and the target wireless node after the user equipment is handed over from the source wireless node to the target wireless node.

According to a third aspect, an embodiment of the present disclosure provides a network element. The network element is a first network element. The first network element includes a receiver, a transmitter, a memory, and a processor coupled to the memory. The receiver, the transmitter, the memory, and the processor may be connected using a bus or in another manner. The transmitter is configured to send data and signaling to an external device. The receiver is configured to receive data and signaling from the external device. The memory is configured to store program code and related data (such as configuration information, a security context, and a key). The processor is configured to invoke and run the program code stored in the memory, and perform related steps in the method according to the first aspect.

According to a fourth aspect, an embodiment of the present disclosure provides a target access network device. The target access network device includes a receiver, a transmitter, a memory, and a processor coupled to the memory. The receiver, the transmitter, the memory, and the processor may be connected using a bus or in another manner. The transmitter is configured to send data and signaling. The receiver is configured to receive data and signaling. The memory is configured to store program code and related data (such as configuration information, a security context, and a key). The processor is configured to invoke and run the program code stored in the memory, and perform related steps in the method according to the second aspect.

According to a fifth aspect, an embodiment of the present disclosure provides a network element. The network element includes a receiving module, a key processing module, and a sending module. The network element is configured to implement the method according to the first aspect.

According to a sixth aspect, an embodiment of the present disclosure provides a computer readable storage medium configured to store code for implementing the method according to the first aspect or the second aspect.

According to a seventh aspect, an embodiment of the present disclosure provides a computer software product. When being run in a computer, the computer software product may be configured to implement the method according to the first aspect or the second aspect.

During implementation of the embodiments of the present disclosure, in an inter-network-element (for example, inter-AMF handover) implementation process, a communications system may correspondingly generate a security key, and obtain and transmit a security context and a security key on the target side using a security network element (an SEAF/AMF). The embodiments of the present disclosure help implement security protection in an inter-AMF handover scenario in a future mobile communication architecture (such as 5G), improve security of the future mobile communication architecture, and satisfy a user requirement.

BRIEF DESCRIPTION OF DRAWINGS

The following briefly describes the accompanying drawings required for the background or embodiments.

DESCRIPTION OF EMBODIMENTS

Technical solutions in the embodiments of the present disclosure are clearly described in the following with reference to the accompanying drawings.

Figure 1:
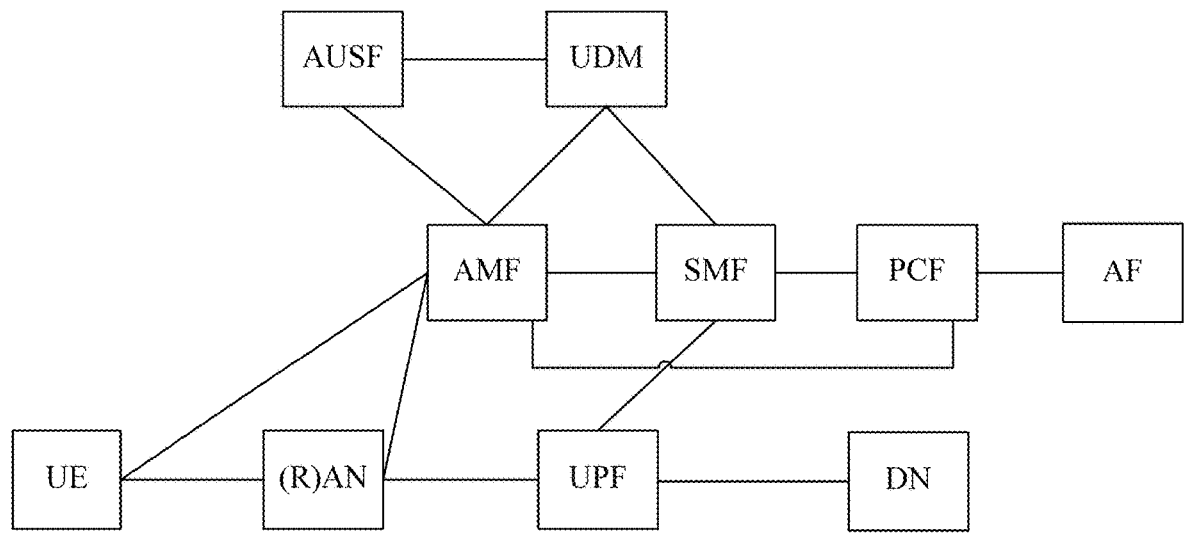
FIG. 1 is a schematic architectural diagram of a mobile communications system according to an embodiment of the present disclosure.

For ease of understanding the solutions, a network architecture that may be applied in the solutions in the embodiments of this application is first described as an example with reference to a related accompanying drawing. FIG. 1 shows a network architecture of future mobile communication. The network architecture includes user equipment, an access network device, and an operator network (for example, a 3GPP 5G network). The operator network further includes a core network and a data network, and the user equipment accesses the operator network using an access network device. Detailed descriptions are as follows.

User equipment (UE). The UE is a logical entity. For example, the UE may be any one of terminal equipment, a communications device, or an Internet of Things (IoT) device. The terminal equipment may be a smartphone (or smart phone), a smartwatch (or smart watch), a smart tablet, or the like. The communications device may be a server, a gateway (GW), a controller, or the like. The IoT device may be a sensor, an electricity meter, a water meter, or the like.

Access network (AN). The AN may be also referred to as a radio access network (RAN) in some implementations, and the RAN includes access network devices and is responsible for the user equipment's access. The RAN may be a base station (such as a NodeB (NB), an Evolved NodeB (eNB), or a Next Generation NodeB (gNB)), a Wi-Fi access point, a Bluetooth access point, or the like.

Data network (DN). The DN may be an external network of an operator, or may be a network controlled by an operator, and is configured to provide a business service to a user. The UE may access the operator network in order to access the DN, and use a service provided by the operator or a third party on the DN.

Core network (CN). As a bearer network, the CN provides an interface to the DN, provides the UE with a communication connection, authentication, management, and policy control, data service bearing, and the like. The CN further includes an access and mobility management function, a session management function, an authentication server function, a policy control function, an application function, a user plane function, and the like. Related descriptions are as follows.

Access and mobility management function (AMF). As a control plane network element provided by an operator, the AMF is responsible for access control and mobility management when the UE accesses the operator network, and processes network signaling while serving as an NAS signaling termination.

Security anchor function (SEAF). The SEAF is connected to the AMF, and serves as a node of a security authentication function. In some implementations, in terms of physical location, the AMF and the SEAF may be integrated, or the AMF and the SEAF may be separately and independently disposed. In addition, during possible implementation, functions of the AMF and the SEAF may be separately deployed in different network elements, or several functions of the AMF and the SEAF may be disposed in a same network element (for example, the AMF has functions of the SEAF).

Session management function (SMF). The SMF is a control plane network element provided by the operator, and is responsible for managing a session of a data packet of the UE.

Authentication server function (AUSF). The authentication server function AUSF is a control plane network element provided by the operator, and is used for UE authentication. The AUSF may be separately deployed as an independent logical function entity, or may be integrated in a device such as the AMF/SMF.

Unified data manager (UDM). The UDM is a control plane network element provided by the operator, and is responsible for storing a subscriber permanent identifier (SUPI), registration information, a credential, and subscription data of the operator network. The data is used for authentication and authorization when the UE accesses the operator network.

Application function (AF). The AF is configured to store a service security requirement, and provide information about policy determining.

User plane function (UPF). The UPF may be a gateway, a server, a controller, a user plane function network element, or the like. The UPF may be disposed inside the operator network, or may be disposed outside the operator network. The UPF is a user plane network element provided by the operator, and is a gateway for communication between the operator network and the DN.

Policy control function (PCF). A policy control function is deployed in the PCF, and the policy control function is a function of completing negotiation for a user plane protection mechanism based on a security requirement in order to determine the user plane protection mechanism in a network.

It should be noted that FIG. 1 shows logical relationships between the network elements. In practice, some network elements may be separately deployed, or two or more network elements may be integrated in a same entity. For example, the AMF and the SMF may be deployed in a same entity, or the AMF and the SMF may be separately deployed in different entities.

Figure 2:
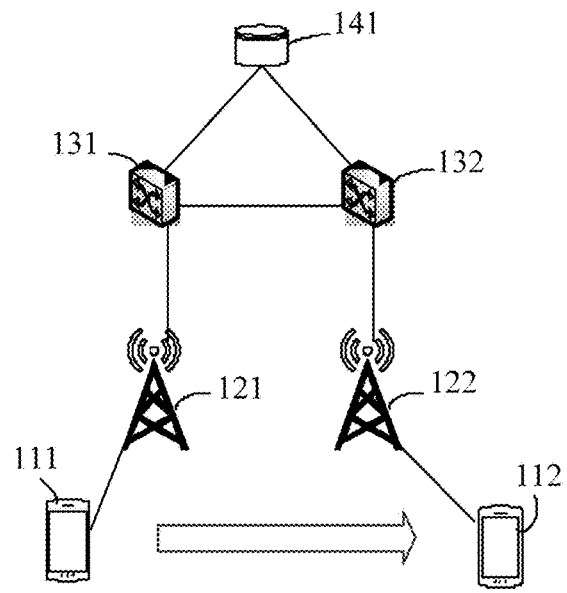
FIG. 2 is a schematic diagram of a scenario of a Long-Term Evolution (LTE) system according to an embodiment of the present disclosure.

FIG. 2 shows an application scenario of communication handover in an LTE communications system. The LTE communications system includes three parts: an evolved packet core (EPC), a base station (eNode B), and a user equipment. The EPC is responsible for a core network part. The EPC includes a home subscriber server (HSS) 141 configured to store user subscription information, and a mobility management entity (MME) for signaling processing and mobility management. The base station is responsible for an access network part. The base station is connected to the core network. As shown in the figure, a base station 121 is connected to an MME 131, and a base station 122 is connected to an MME 132. Uplink communication or downlink communication is performed between the user equipment and the base station using an LTE air interface technology (such as a Uu interface).

In an example communication scenario, the user equipment is in communication connection with the base station 121. If the user equipment moves from a location 111 to a location 112, the user equipment may need to hand over a communication connection from the base station 121 to the base station 122. After a handover process is completed, the user equipment is in communication connection with the base station 122, and then communication can continue to be performed. It can be learned that, in this process, the base station 121 and the base station 122 are respectively connected to different MMEs, and therefore the foregoing communication handover process is also accompanied with communication handover of the MMEs.

Figure 3:
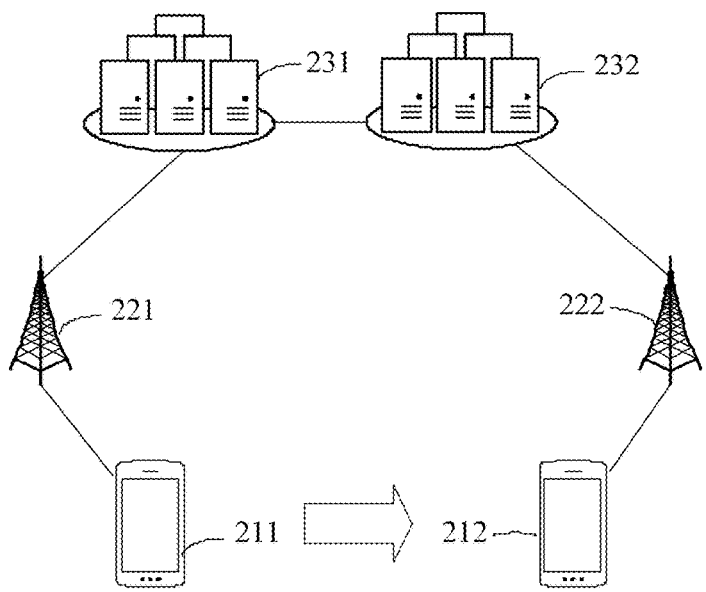
FIG. 3 is a schematic diagram of a scenario of a 5G system according to an embodiment of the present disclosure.

FIG. 3 shows an application scenario of communication handover in a 5G communications system. The 5G communications system includes a user equipment, an access network, and a core network. Refer to the related description of the embodiment in FIG. 1. The access network includes a RAN device 221 and a RAN device 222. The core network includes a core network device group 231 and a core network device group 232. The access network devices are connected to core network devices. As shown in the figure, the RAN device 221 is connected to an AMF in the core network device group 231, and the RAN device 222 is connected to an AMF in the core network device group 232. Uplink communication or downlink communication is performed between the user equipment and the access network device using a 5G air interface technology.

In an example communication scenario, the user equipment is in communication connection with the RAN device 221. If the user equipment moves from a location 211 to a location 212, the user equipment may need to hand over a communication connection from the RAN device 221 to the RAN device 222. After a handover process is completed, the user equipment is in communication connection with the RAN device 222, and then communication can continue. It can be learned that, in this process, the RAN device 221 and the RAN device 222 are respectively connected to AMFs in different core network device groups, and therefore the foregoing communication handover process is also accompanied with communication handover of the AMFs.

Figure 4:
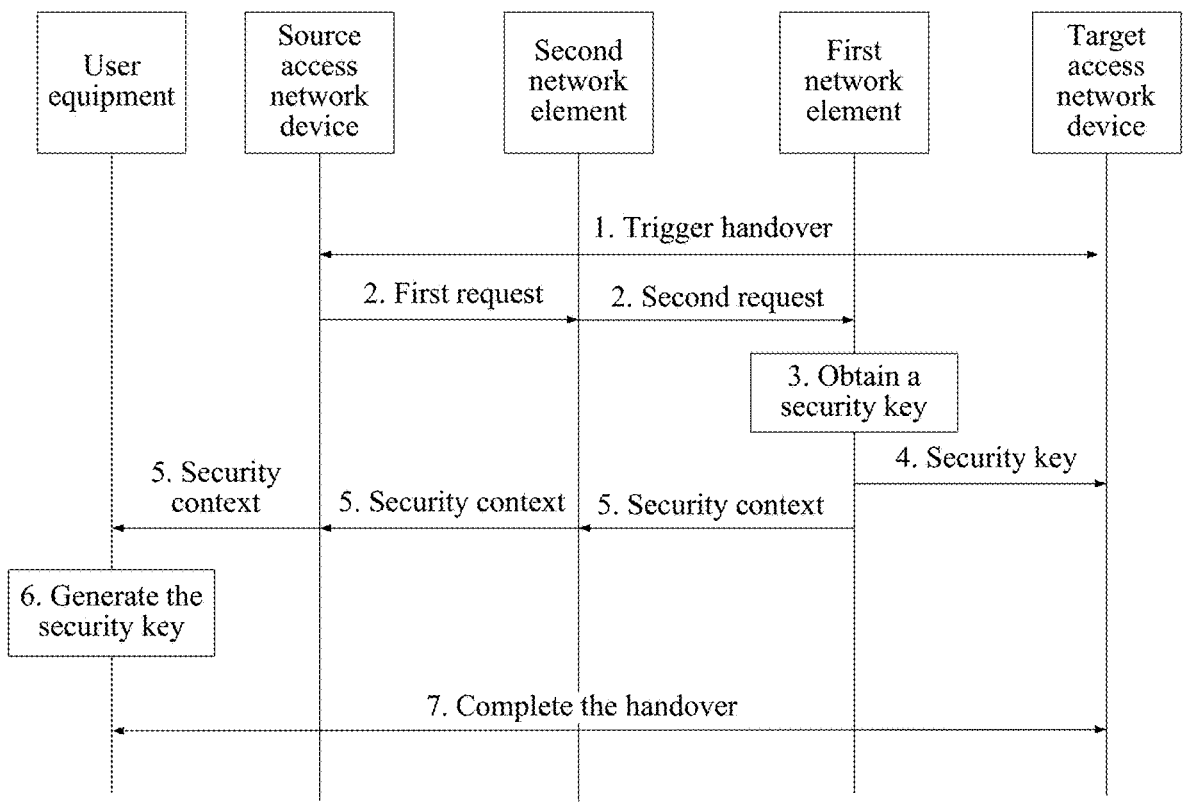
FIG. 4 is a schematic flowchart of a security implementation method according to an embodiment of the present disclosure.

To improve network security of a future mobile communication architecture, and obtain sufficient security assurance on a network side and a user equipment side after inter-AMF handover, an embodiment of the present disclosure provides a security implementation method. Referring to FIG. 4, the method includes, but is not limited to, the following steps.

1. A source access network device triggers communication handover.

In this embodiment of the present disclosure, a user equipment establishes a communication connection to the source access network device using an access technology. When the user equipment needs to be handed over from a currently connected source RAN to a target RAN, the source access network device triggers communication handover. The access technology may be a technology such as CDMA2000, wireless local area network (WLAN), fixed access, Worldwide Interoperability for Microwave Access (WiMAX), Long Term Evolution (LTE), or 5G.

In an example application scenario, when the UE is handed over between AMFs, that is, handed over from a source AMF to a target AMF, a source RAN connected to and managed by the source AMF of the UE also needs to be handed over to a target RAN. There may be a variety of reasons for the handover. For example, there is no Xn interface connection between the source RAN and the target RAN, and when the UE moves from a communication cell of the source RAN to a communication cell of the target RAN, a current communication connection needs to be handed over from the source RAN to the target RAN. For another example, when congestion of a current network causes a communication resource to be insufficient, a currently connected source RAN needs to hand over a communication connection request of the UE to a target RAN whose network status is relatively good. For another example, a current communications system (such as LTE) needs to be handed over to another communications system (such as 5G).

2. The source access network device sends a first request to a second network element; and the second network element sends a second request to a first network element.

The first request sent by the source access network device to the second network element and the second request sent by the second network element to the first network element may be a same request, or may be different requests. The first request or the second request may carry a security context of a source side. For example, the security context of the source side may include one or more of a key lifetime, a key index, a security capability of UE, an integrity algorithm, an integrity algorithm identifier, an encryption algorithm, an encryption algorithm identifier, and a counter related to key calculation. For example, the first request is a handover request. For example, the second request is a path switching request. For related requests in the following embodiments, refer to the description herein, and details are not described again later.

The second network element is connected to the source access network device, and the second network element and the source access network device are network devices on the source side. The first network element is connected to a target access network device, and the first network element and the target access network device are network devices on a target side.

In some implementations, the second network element may be a network device such as a source AMF, a source SEAF, or a source SMF, and the first network element may be a corresponding network device such as a target AMF, a target SEAF, or a target SMF.

3. The first network element obtains a security key.

The security key is used for protecting communication between the user equipment and a target network after the user equipment is handed over from the source access network device to the target access network device, where the target network includes the target access network device and a target core network device, and the target core network device includes the first network element. The security key may include an access stratum AS key and a non-access stratum NAS key. The AS key is used for protecting communication between the user equipment and an access network device, and the NAS key is used for protecting communication between the user equipment and a core network device (such as an AMF/SEAF/SMF).

The first network element obtaining a security key may include generating, by the first network element, the security key, or obtaining, by the first network element, the security key sent by another network element.

In this embodiment of the present disclosure, the first network element may first obtain a first intermediate key, where the first intermediate key is an upper-layer key generated after authentication, and is used for deriving a lower-layer access stratum (AS) key and a lower-layer non-access stratum (NAS) key. For example, the first intermediate key is new Kamf. Then, the first network element determines a security protection algorithm, including a security algorithm and a security algorithm identifier, where the identifier may be used for indicating the protection algorithm. Then, the first network element derives the security key based on the security protection algorithm and the first intermediate key. The security protection algorithm may include an NAS confidentiality algorithm identifier, an NAS integrity algorithm identifier, an AS confidentiality algorithm identifier, or an AS integrity algorithm identifier.

The security key may include a first key, a second key, and a third key, where the first key is an intermediate key for security protection between the user equipment and the target access network device, for example, a key KgNB. The second key is an NAS signaling encryption protection key, for example, a key Knasenc, and the third key is an NAS signaling integrity protection key, for example, Knasint.

In an embodiment, the first network element may derive the first key based on a first parameter, where the first parameter includes one or more of the first intermediate key, a target cell identifier, a frequency channel number, an NAS count value, an NAS connection identifier, a count value Nonce, a counter, a random number, or a sequence number. The first network element may derive the second key based on a second parameter, where the second parameter includes one or more of the first intermediate key, an NAS confidentiality algorithm identifier, a count value Nonce, a counter, a random number, or a sequence number. The first network element may derive the third key based on a third parameter, where the third parameter includes one or more of the first intermediate key, an NAS integrity algorithm identifier, a count value Nonce, a counter, a random number, or a sequence number. The first network element may store the second key and the third key, and send the first key to an access network device in a subsequent step.

The first network element may obtain the first intermediate key in various manners.

In an embodiment, the first network element obtains the first intermediate key that is derived by the second network element based on a second intermediate key and a network parameter. The second intermediate key is an upper-layer key generated after authentication, and is used for deriving a lower-layer access stratum key and a lower-layer non-access stratum key. For example, the second intermediate key is a key Kamf that originally exists in the second network element, and the key Kamf is obtained by the second network element when the authentication succeeds.

In an embodiment, the first network element receives the second intermediate key sent by the second network element, and the first network element derives the first intermediate key based on the second intermediate key and a network parameter.

In an embodiment, after the user equipment is handed over from the source access network device to the target access network device, and two-way authentication on the user equipment succeeds again, the first network element obtains an anchor key Kseaf. In addition, the first network element derives the first intermediate key based on the anchor key and a network parameter.

The network parameter may include one or more of a target side identifier, a slice identifier, an NAI, NSSAI, an AMF region identifier, an AMF setting identifier, a globally unique AMF identifier (GUAMI), an AMF pointer, an AMF set identifier, a count value Nonce, a counter, a random number, or a sequence number.

In an embodiment of the present disclosure, the first network element may further obtain a next hop key, namely, a first NH, and a next hop chaining counter, namely, a first NCC, where the first NH and the first NCC are sent by the second network element. The first network element may obtain a pair of {second NH, second NCC} based on a pair of {first NH, first NCC}. In a subsequent step, the first network element may send the pair of {second NH, second NCC}, the second key, and the third key to the target access network device, and the target access network device generates the first key based on the pair of {second NH, second NCC}.

4. The first network element sends the security key to a target access network device, where the sent security key includes a first key.

5. The first network element sends a security context to a user equipment using a second network element and an access network device, such that the user equipment may generate the security key based on the security context, where the security context received by the user equipment needs to include only a parameter. For example, the parameter may comprise a random number RAND, a count value Nonce, a counter, a timestamp, or a related security protection algorithm identifier, that the user equipment side does not have when the network side generates keys related to the security key.

6. The user equipment generates the security key based on the security context. In an embodiment, the user equipment may generate the security key based on the security context, the network parameter, a locally pre-stored intermediate key, or the like. The security key herein includes an AS key and an NAS key.

7. The user equipment and the target access network device complete a subsequent handover process, such that a communication connection of the user equipment is finally handed over from a current source RAN to a target RAN.

It is to be noted that, in this embodiment of the present disclosure and embodiments described later, a security-related message (such as a security context, an intermediate key, a key request, or a key response) transmitted between the source side and the target side, between the source side and a UE side, or between the target side and the UE side may be transmitted in a form of an independent message, or may be carried in another message (such as a handover-related request or response) for transmission, and this is not limited herein in the present disclosure.

Figure 5:
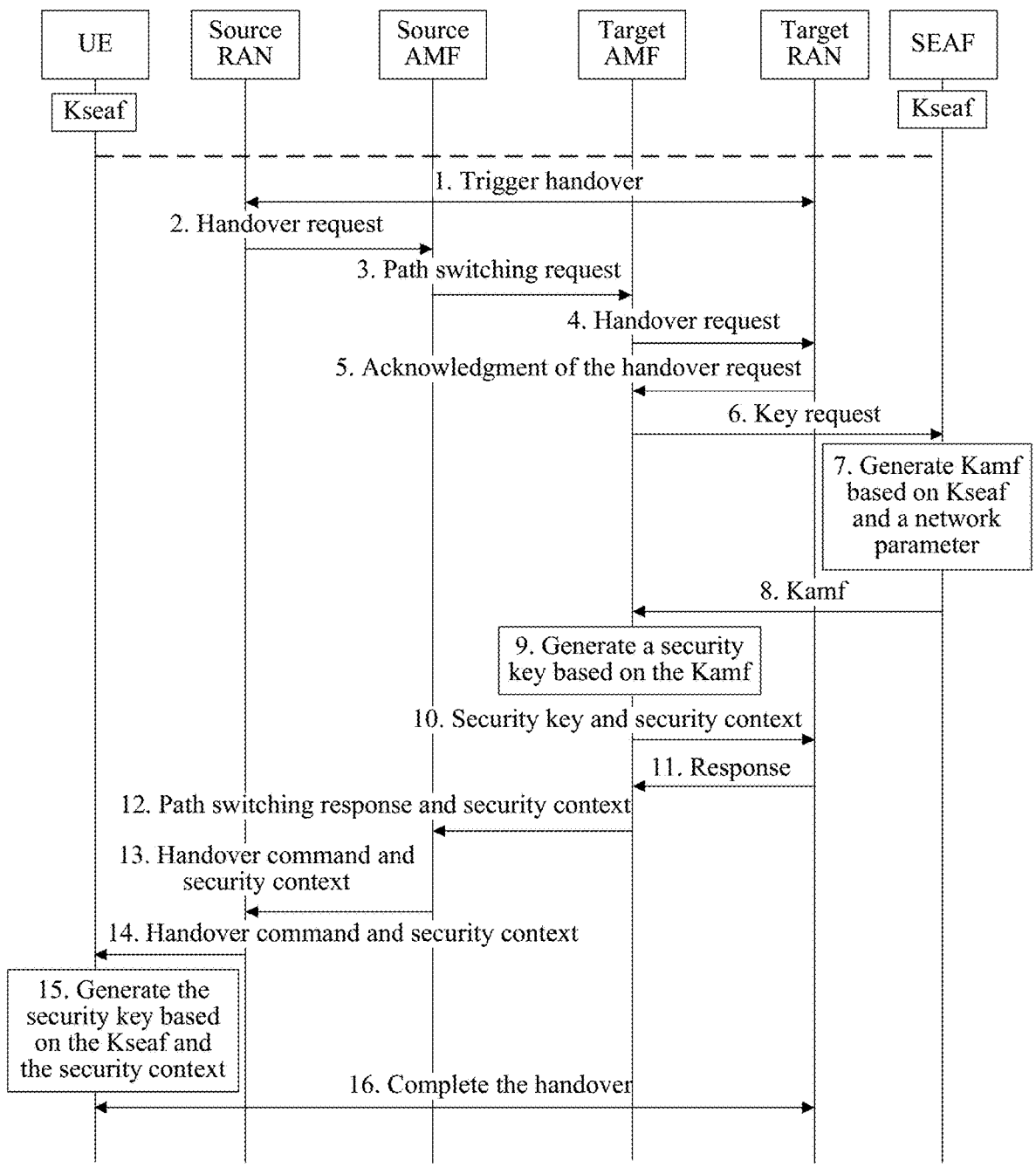
FIG. 5 is a schematic flowchart of another security implementation method according to an embodiment of the present disclosure.

Referring to FIG. 5, an embodiment of the present disclosure provides another security implementation method. In an application scenario of this method, after a UE is authenticated on a network, an anchor key Kseaf may be configured on a UE side and a network side (such as an SEAF). When the UE needs to be handed over from a currently connected source RAN to a target RAN, network security may be implemented using the following method. The method includes, but is not limited to, the following steps.

1. The source RAN triggers communication handover.

In this embodiment of the present disclosure, when the UE is handed over between AMFs, that is, handed over from a source AMF to a target AMF, a source RAN connected to and managed by the source AMF also needs to be handed over to the target RAN. The source RAN can trigger the communication handover. There may be a variety of reasons for the handover. For example, there is no Xn interface connection between the source RAN and the target RAN, and when the UE moves from a communication cell of the source RAN to a communication cell of the target RAN, a current communication connection needs to be handed over from the source RAN to the target RAN. For another example, when congestion of a current network causes a communication resource to be insufficient, a currently connected source RAN needs to hand over a communication connection request of the UE to a target RAN whose network status is relatively good.

2. The source RAN sends a handover request to a source AMF.

The source RAN sends a Handover Required message to the source AMF, to notify the source AMF that a user needs to perform handover, where the Handover Required message carries an identifier of the UE. The AMF specifies a bearer used for forwarding data (a message).

3. The source AMF sends a path switching request to a target AMF.

To implement the communication handover, the source AMF selects a target AMF, and sends a path switching request (Forward Relocation Request) to the target AMF. The path switching request may include a security context of a source side.

4. The target AMF sends a handover request to the target RAN.

The target AMF sends a Handover Request message to the target RAN, to request the target RAN to establish a radio network resource, and create, on the target RAN, a context of the UE. After a Protocol Data Unit (PDU) session is activated, the target AMF may further allocate an identifier of an uplink communication tunnel and an IP address to the PDU session, and sends the PDU session to the target RAN.

5. The target RAN returns an acknowledgment message of the handover request to the target AMF.

The target RAN sends the acknowledgment message of the handover request to the target AMF. The acknowledgment message includes a PDU session that has been accepted by the target RAN. The target RAN allocates an identifier of a downlink communication tunnel and an IP address of the PDU session, and sends the PDU session to the target AMF.

6. The target AMF sends a key request to the SEAF.

In this embodiment of the present disclosure, the SEAF serves as a node for security authentication and key configuration, and the AMF and the SEAF may be separately deployed, or may be integrated. When the AMF and the SEAF are separately deployed, there may be one or more SEAFs. For example specific, during the inter-AMF handover, the source AMF and the target AMF may be connected to a same SEAF, or the source AMF and the target AMF may be separately connected to different SEAFs (the source AMF is connected to a source SEAF, and the target AMF is connected to a target SEAF). In this case, the inter-AMF handover is accompanied with inter-SEAF handover. When the AMF and the SEAF are integrated, the AMF and the SEAF may be deployed in a same physical location, but are still two logical entities having different functions, and then the inter-AMF handover is also accompanied with inter-SEAF handover.

In this embodiment of the present disclosure, to ensure network communication security after the inter-AMF handover, the target AMF sends the key request to the SEAF, to obtain an intermediate key used for generating the security key.

It is to be noted that there is no mandatory sequence between step 6 and steps 4 and 5. That is, in some implementations, step 6 may be alternatively placed after step 3, or may be placed after step 4. This is not limited herein in the present disclosure.

It is to be further noted that, in this embodiment of the present disclosure, the key request is not limited to a separate signaling message. In some implementations, the key request in step 6 may be carried in another interactive message between the target AMF and the SEAF.

7. The SEAF generates Kamf based on Kseaf and a network parameter.

The key Kseaf is an anchor key. The anchor key is a key generated after authentication, and is an upper-layer key on a serving network. The anchor key may be used for deriving a lower-layer key on the serving network.

It is to be noted that, in this embodiment of the present disclosure, after the UE is authenticated on the network, the SEAF has the key Kseaf. The Kseaf may be permanently stored in the SEAF, or may be temporarily stored in the SEAF. The Kseaf is deleted after the lower-layer key on the network is generated. In the latter case, when the SEAF receives the key request of the target AMF, the SEAF may send a request to an AUSF, and the AUSF generates the Kseaf based on the request, and sends the Kseaf to the SEAF.

The SEAF generates the new intermediate key Kamf (a first intermediate key) based on the Kseaf and the network parameter, where the Kamf may be used for deriving a lower-layer access stratum AS key and a lower-layer non-access stratum NAS key.

The network parameter is a related parameter on the network side. For example, the network parameter may be one or more of a target side identifier, a slice identifier, an NAI, NSSAI, an AMF region identifier, a GUAMI, an AMF pointer, an AMF set identifier, an AMF setting identifier, a count value Nonce, a counter, a random number, or a sequence number. In some implementations, the network parameter may further include other parameters. The following briefly describes the network parameter.

Target side identifier. The target side identifier may be an identifier that can uniquely identify target side information, such as a target-side serving network identifier, a target-side specific cell ID, or a target-side base station ID.

Slice identifier. The slice identifier is used for uniquely identifying a network slice ID.

Network access identifier (NAI). The NAI is usually used for uniquely identifying a mobile node.

Network slice selection assistance information (NSSAI). The NSSAI may include various identifiers of a slice, and an identifier of a slice-related entity. By providing the NSSAI, a terminal may select and create an instance related to a network slice. One piece of network slice selection assistance information may correspond to one network slice.

AMF region identifier (AMF Region ID). The AMF Region identifier is an identifier used for distinguishing a region in which an AMF is located.

AMF setting identifier (AMF Set ID). The AMF Set identifier is an identifier that uniquely identifies an AMF set in an AMF region.

AMF pointer. The AMF pointer is an identifier that uniquely identifies an AMF in an AMF set.

Globally unique AMF identifier (GUAMI). The GUAMI may be used for finally indicating an AMF, and may comprise: <GUAMI>=<MCC><MNC><AMF region identifier><AMF setting identifier><AMF pointer>, where the MCC indicates a mobile country code (MCC), and the MNC indicates a mobile network code (MNC).

Other parameters. In some embodiments of the present disclosure, other network parameters may further comprise a timestamp, a registration type, an AMF ID, an SEAF ID, an NAS count, a security algorithm identifier, a security algorithm type name, a sequence number SQN, or an AK, and may further be lengths of these parameters or a foregoing crucial parameter, or the like. For descriptions of "other parameters" used for generating a related key in the following description, refer to the description herein, as details are not described again later.

For example, in an embodiment, the SEAF derives the intermediate key Kamf based on the Kseaf and the network parameter: Kamf=KDF (Kseaf, target side ID, slice ID, NAI, NSSAI, AMF region identifier, GUAMI, AMF pointer, AMF setting identifier, count value Nonce, counter, random number, sequence number, or other parameters), where the KDF is a key derivation function.

8. The SEAF sends the Kamf to the target AMF, and correspondingly, the target AMF obtains the Kamf.

9. The target AMF generates a security key based on the Kamf.

The security key is used for protecting communication between the UE and the target RAN after the UE is handed over from the source RAN to the target RAN. A protocol stack may be divided into an access stratum (AS) and a non-access stratum (NAS). Therefore, the security key generated herein needs to include an AS key and an NAS key.

In an embodiment, after receiving the intermediate key Kamf, the target AMF may determine a key protection algorithm based on a preset rule. For example, an algorithm priority list is preset in the target AMF, and the algorithm priority list includes a plurality of algorithm IDs. The target AMF searches the algorithm priority list, and selects a new NAS algorithm based on the algorithm priority list, to obtain an NAS confidentiality algorithm ID and an NAS integrity algorithm ID. The target AMF may alternatively select a new AS algorithm, to obtain an AS confidentiality algorithm ID and an AS integrity algorithm ID.

For the AS key, the target AMF first generates an intermediate key KgNB. The KgNB is an intermediate key used on a target RAN side, and the KgNB is used for generating, on the target RAN side, a key (such as Krrcenc, Krrcint, Kupenc, or Kupint) related to the AS. In a subsequent step, the KgNB is to be sent to the target access network device.

In this embodiment of the present disclosure, the target AMF may derive the KgNB based on the Kamf and a first parameter as follows: KgNB=KDF (Kamf, target cell identifier, frequency channel number, NAS count value, NAS connection identifier, count value Nonce, counter, random number, sequence number, or other parameters).

The NAS count value is a counter of NAS messages transmitted by the NAS or a counter of NAS data packets, and may be an uplink NAS count value or a downlink NAS count value. The frequency channel number (Evolved Universal Terrestrial Radio Access (E-UTRA) Absolute Radio Frequency Channel Number (EARFCN)-downlink (EARFCN-DL)) indicates a downlink communication frequency of a network. The target cell identifier (Target physical cell ID) is used for uniquely identifying a target cell.

For the NAS key, the target AMF needs to generate Knasenc and Knasint. The Knasenc herein is an NAS signaling encryption protection key on the network side, and the Knasint herein is an NAS signaling integrity protection key on the network side. The target AMF stores the NAS key, and may further send the NAS key to another core network device as required.

In this embodiment of the present disclosure, the target AMF derives the Knasenc based on the Kamf, the re-determined key protection algorithm, and a second parameter as follows: Knasenc=KDF (Kamf, NAS confidentiality algorithm ID, count value Nonce, counter, random number, sequence number, or other parameters).

In this embodiment of the present disclosure, the target AMF derives the Knasint based on the Kamf, the re-determined key protection algorithm, and a third parameter as follows: Knasint=KDF (Kamf, NAS integrity algorithm ID, count value Nonce, counter, random number, sequence number, or other parameters).

10. The target AMF sends the security key and a security context to the target RAN. Correspondingly, the target RAN obtains the security key and the security context. The security key herein includes the KgNB.

In an embodiment, the target AMF also notifies the target RAN of a selected NAS algorithm (which may also include an AS algorithm), such that the target RAN determines a security protection algorithm.

In an embodiment, the target AMF may further send the security context to the target RAN. The security context includes information related to network security. For example, the security context may include: a key lifetime, a key index, a security capability of the UE, an integrity algorithm, an integrity algorithm identifier, an encryption algorithm, an encryption algorithm identifier, a counter related to key calculation, or the like. The security context may further include a specific key. The security capability of the UE may be a list of encryption and integrity algorithms supported by the UE, a key length or a key lifetime that is required by the UE, or the like.

After obtaining the security key, the target RAN continues to derive a specific AS key, including the key Krrcenc, the key Krrcint, the key Kupenc, the key Kupint, or the like, based on the security protection algorithm and the intermediate key KgNB. The key Krrcenc is a control plane signaling ciphering key on a radio access side of an air interface. The key Krrcint is a signaling integrity protection key on the radio access side of the air interface. The key Kupenc is a user plane encryption protection key on the radio access side of the air interface. The key Kupint is a user plane integrity protection key on the radio access side of the air interface.

It is to be noted that, if step 6 is placed after step 3, in some embodiments, the security key and the security context in step 10 may be further placed in the Handover Request message in step 4 in some implementations.

11. The target RAN sends a response to the target AMF, to notify the target AMF that the security key is successfully obtained.

12. The target AMF sends a path switching response and the security context to the source AMF.

In an embodiment, to respond to the path switching request in step 3, the target AMF sends an acknowledgment message of the path switching request to the source AMF. The acknowledgment message of the path switching request may carry the security context.

13. The source AMF sends a handover command and the security context to the source RAN.

In an embodiment, to respond to the handover request in step 2, the source AMF sends the handover command (HO Command) to the source RAN, to notify the source RAN that a handover preparation is completed. The handover command may carry the security context.

14. The source RAN sends the handover command and the security context to the UE.

In an embodiment, the source RAN sends the handover command to the UE, to notify the UE that the handover preparation is completed, and to trigger the UE to complete a subsequent handover operation. The handover request may carry the security context.

15. The UE generates the security key based on the Kseaf and the security context.

It is to be noted that, the security context received on a UE side needs to include only a parameter that the UE side does not have when keys are generated on the network side, for example, a random number, a timestamp, or a security protection algorithm identifier. The UE may already have, in the foregoing steps, another parameter used for generating the keys.

After the UE is originally authenticated on the network, the Kseaf is already configured for the UE, and the UE further shares the network parameter on the network side in advance. Therefore, for the UE, the UE may similarly generate a new NAS key and a new AS key based on the Kseaf, the network parameter, and the security context. For example, the UE may first generate the Kamf based on the Kseaf, and then generate the AS key (such as the Krrcenc, the Krrcint, the Kupenc, or the Kupint) and the NAS key (such as the Knasenc or the Knasint) based on the Kamf, the network parameter, and the security context. For a specific process, similarly refer to related descriptions in step 7, step 9, and step 10, and details are not described herein again.

16. The UE and the target RAN complete a subsequent handover process.

The UE and the target RAN further continue to complete the subsequent handover process. For example, after the UE is successfully synchronized to a target cell, the UE sends a handover acknowledgment message to the target RAN. The target RAN sends a handover notification to the target AMF, to notify the target AMF that the UE is already located in the target cell. The target AMF sends a path switching completion message to the source AMF. Then, the source AMF returns a response to the target AMF. The source AMF sends a UE context release message to instruct the source RAN to release a resource related to the UE. The source RAN returns a release acknowledgment message to the source AMF, and so on. Finally, the communication connection of the UE is handed over from the source RAN to the target RAN.

It is to be noted that, in this embodiment of the present disclosure, when a communications system performs AMF handover, SMFs corresponding to different AMFs may be different. Therefore, SMF handover may also occur in the foregoing process. In this case, security protection of the PDU session also needs to be considered.

During some implementations, in step 7, when the SEAF generates the Kamf, an update of a PDU session key needs to be considered on a target side. Therefore, when the SEAF generates the Kamf, the SEAF sends indication information to the AUSF, to trigger the AUSF to generate a new PDU session key. For example, a key Left K is pre-stored in the AUSF. Therefore, the AUSF may generate the new PDU session key Ksmf based on the Left K, and UE-related information and session information (such as a session ID and slice information) that are sent by the source AMF as follows: Ksmf=KDF (Left K, NAI, NSSAI, slice ID, AMF-related parameter, SMF-related parameter, count value Nonce, counter, random number, sequence number, or other parameters).

Then, the AUSF sends the Ksmf to the SEAF or the target AMF, the SEAF or the target AMF forwards the Ksmf to the target SMF and the UE, and the target SMF/the UE uses the Ksmf to update the PDU session key.

It can be learned that, during implementation of this embodiment of the present disclosure, in an implementation process of inter-AMF handover, the communications system may correspondingly generate the security key, and obtain and transmit the security context and the security key of the target side using a security network element SEAF/AMF or the like. For the network, the security key of the target side is generated by a network element (such as the SEAF/target AMF) on the target side. Therefore, the target RAN cannot obtain the security key used by the source RAN, and cannot decode communication information between the source RAN and the UE, thereby implementing backward security of network communication. The source RAN cannot obtain the security key used by the target RAN, and cannot decode communication information between the target RAN and the UE, thereby implementing forward security of network communication.

Figure 6:
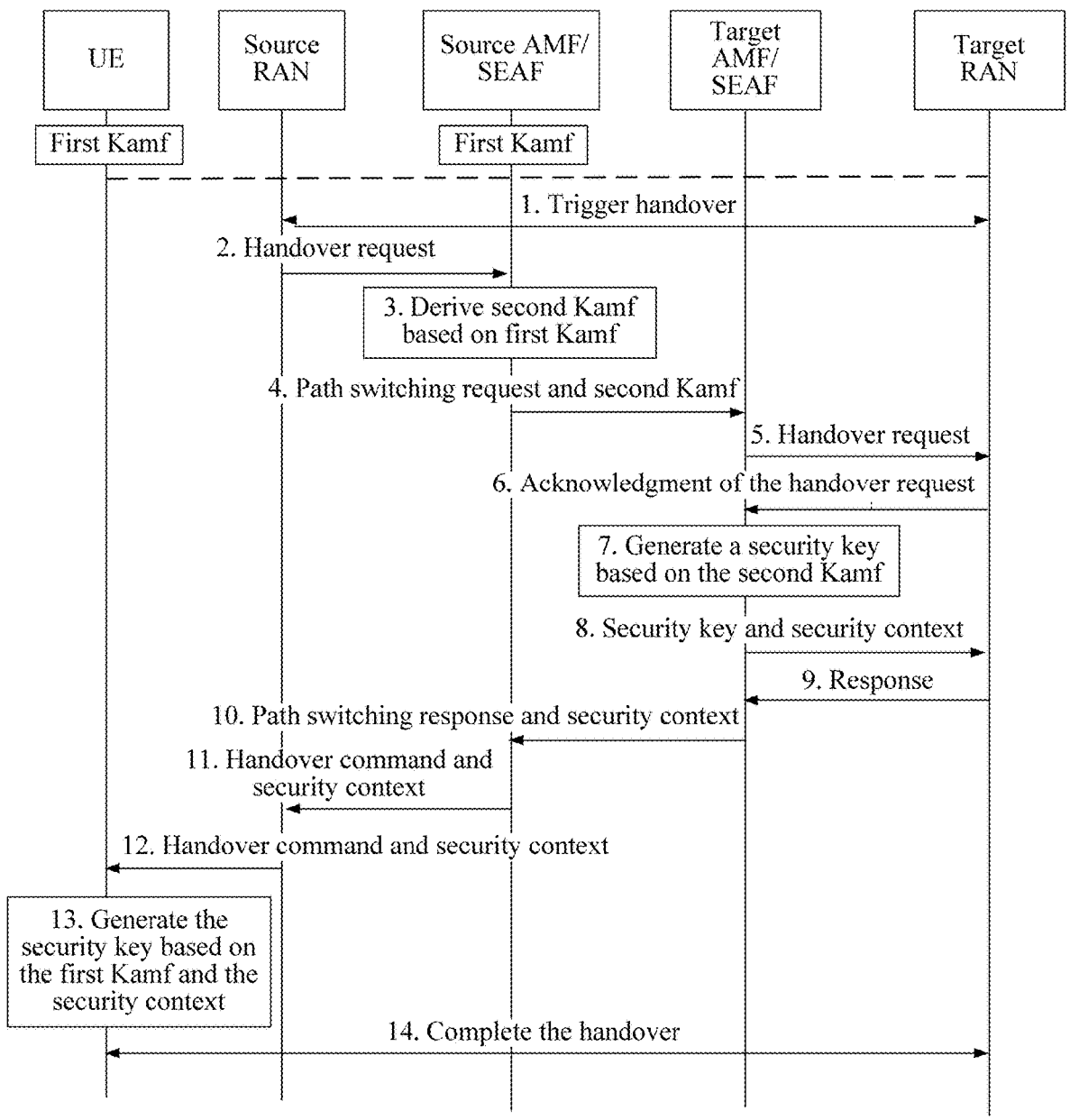
FIG. 6 is a schematic flowchart of still another security implementation method according to an embodiment of the present disclosure.

Referring to FIG. 6, an embodiment of the present disclosure provides another security implementation method. In an application scenario of this method, after a UE is authenticated on a network, first Kamf may be configured on a UE side and a network side (such as a source AMF/source SEAF). When the UE needs to be handed over from a currently connected source RAN to a target RAN, network security may be implemented using the following method. The method includes, but is not limited to, the following steps.

1. The source RAN triggers communication handover. Refer to the description in step 1 in FIG. 5.

2. The source RAN sends a handover request to the source AMF/source SEAF.

In this embodiment of the present disclosure, the SEAF serves as a node for security authentication and key configuration. The source AMF and the source SEAF may be separately deployed, or may be integrated. When the source AMF and the source SEAF are separately deployed, the source AMF is connected to the source SEAF. In this case, inter-AMF handover is accompanied with inter-SEAF handover. When the source AMF and the source SEAF are integrated, the source AMF and the source SEAF may be deployed in a same physical location, but are still two logical entities having different functions, and then the inter-AMF handover is also accompanied with the inter-SEAF handover.

3. The source AMF/source SEAF derives second Kamf based on the first Kamf.

After the source AMF/SEAF receives the handover request sent by the source RAN, the source SEAF/AMF generates a second intermediate key Kamf (or the second Kamf) based on a pre-stored first intermediate key Kamf (or the first Kamf,) and a network parameter. For example, the network parameter may be one or more of a target side identifier, a slice identifier, an NAI, NSSAI, an AMF region identifier, a GUAMI, an AMF pointer, an AMF set identifier, a count value Nonce, a random number, or a sequence number. In some implementations, the network parameter further includes other parameters.

In an embodiment, the source SEAF/AMF derives the second Kamf based on the pre-stored first Kamf and the network parameter as follows: Second Kamf=KDF (first Kamf, target side ID, slice ID, NAI, NSSAI, AMF region identifier, GUAMI, AMF pointer, AMF setting identifier, count value Nonce, counter, random number, sequence number, or other parameters).

It is to be noted that, when the source AMF and the source SEAF are separated from each other, that the source AMF/source SEAF derives second Kamf based on the first Kamf may include the following cases.

Case 1: The source AMF derives the second Kamf based on the preset first Kamf.

Case 2: The source SEAF derives the second Kamf based on the preset first Kamf, and sends the second Kamf to the source AMF.

4. The source AMF/source SEAF sends a path switching request and the second Kamf to a target AMF/target SEAF.

In this embodiment of the present disclosure, the target AMF and the target SEAF may be separately deployed, or may be integrated. When the target AMF and the target SEAF are separately deployed, the target AMF is connected to the target SEAF. In this case, inter-AMF handover is accompanied with inter-SEAF handover. When the target AMF and the target SEAF are integrated, the target AMF and the target SEAF may be deployed in a same physical location, but are still two logical entities having different functions, and then the inter-AMF handover is also accompanied with the inter-SEAF handover.

In an embodiment, the source AMF/source SEAF sends a path switching request to the target AMF/target SEAF, where the path switching request carries the second Kamf.

In another embodiment, the source AMF/source SEAF respectively sends the path switching request and the second Kamf to the target AMF/target SEAF.

5. The target AMF/target SEAF sends a handover request to the target RAN.

6. The target RAN feeds back an acknowledgment message of the handover request to the target AMF/target SEAF.

7. The target AMF/target SEAF generates a security key based on the second Kamf.

The security key is used for protecting communication between the UE and the target RAN after the UE is handed over from the source RAN to the target RAN. The security key generated herein includes an AS key and an NAS key.

In this embodiment of the present disclosure, after receiving the intermediate key Kamf, the target AMF/target SEAF may determine an NAS confidentiality algorithm ID and an NAS integrity algorithm ID based on a preset rule, and the target AMF/target SEAF derives KgNB based on the first Kamf and a first parameter, derives Knasenc based on the first Kamf, a key protection algorithm, and a second parameter, and derives Knasint based on the first Kamf, the key protection algorithm, and a third parameter. The target AMF/target SEAF may store the Knasenc and the Knasint. For a specific operation, similarly refer to step 9 in the embodiment in FIG. 5, and details are not described herein again.

It is to be noted that, there is no mandatory sequence between step 7 and steps 5 and 6. For example, during some implementations, step 6 may be alternatively placed after step 4, or may be placed after step 5. This is not limited herein in the present disclosure.

It is to be further noted that, when the target AMF and the target SEAF are separated from each other, that the target AMF/target SEAF generates a security key based on the second Kamf may include the following cases.

Case 1: The target AMF derives the security key based on the preset second Kamf.

Case 2: The target SEAF derives the security key based on the preset second Kamf, and sends the security key to the target AMF.

8. The target AMF/target SEAF sends the security key and a security context to the target RAN. The sent security key includes the KgNB. For an example operation, similarly refer to step 10 in the embodiment in FIG. 5, and details are not described herein again.

9. The target RAN feeds back a response to the target AMF/target SEAF, to notify the target AMF/target SEAF that the security key is successfully obtained.

10. The target AMF/target SEAF feeds back a path switching response and the security context to the source AMF/source SEAF.

In an embodiment, to respond to the path switching request in step 4, the target AMF sends an acknowledgment message of the path switching request to the source AMF. The acknowledgment message of the path switching request may carry the security context.

11. The source AMF/source SEAF feeds back a handover command and the security context to the source RAN. For example, to respond to the handover request in step 2, the source AMF sends the handover command (HO Command) to the source RAN, to notify the source RAN that a handover preparation is completed. The handover request may carry the security context.

12. The source RAN sends the handover command and the security context to UE.

In an embodiment, the source RAN sends the handover command to the UE, to notify the UE that the handover preparation is completed, and to trigger the UE to complete a subsequent handover operation. The handover request may carry the security context.

13. The UE generates the security key based on the first Kamf and the security context.

It is to be noted that, the security context received on a UE side needs to include only a parameter that the UE side does not have when keys are generated on the network side, for example, a random number, a timestamp, or a security protection algorithm identifier. The UE may already have, in the foregoing steps, another parameter used for generating the keys.

After the UE is originally authenticated on the network, the first Kamf is already configured for the UE, and the UE has further shared the network parameter on the network side in advance. Therefore, it may be understood that, for the UE, the UE may similarly generate a new NAS key and a new AS key based on the first Kamf, the network parameter, and the security context. The UE and the target RAN complete a subsequent handover process.

It is to be noted that, in the embodiment in FIG. 6, in a possible implementation, step 3 may be omitted. In step 4, the source AMF/source SEAF sends the first Kamf to the target AMF/target SEAF, and after step 4, the target AMF/target SEAF generates the second Kamf based on the first Kamf.

It is to be further noted that, in this embodiment of the present disclosure, when a communications system performs AMF handover, SMFs corresponding to different AMFs may be different. Therefore, SMF handover may also occur in the foregoing process. In this case, security protection of a PDU session also needs to be considered. During some implementations, in step 7, when the target AMF/target SEAF generates the security key based on the second Kamf, update of a PDU session key needs to be considered on a target side. Further, the target AMF/target SEAF sends indication information to the AUSF, to trigger the AUSF to generate a new PDU session key. For example, a key Left K is pre-stored in the AUSF. Therefore, the AUSF may generate the new PDU session key Ksmf based on the Left K, and UE-related information and session information (such as a session ID and slice information) that are sent by the source AMF/source SEAF.

It can be learned that, during implementation of this embodiment of the present disclosure, in an implementation process of inter-AMF handover, the communications system may correspondingly generate the security key, and obtain and transmit the security context and the security key of the target side using a security network element SEAF/AMF or the like. Derivation of a lower-layer key comes from derivation of the first intermediate key Kamf by the source AMF/source SEAF, and a source AMF/source SEAF side generates and transmits a security context of the target side. For the network, the target RAN cannot decode communication information between the source RAN and the UE, thereby implementing backward security of network communication.

Figure 7:
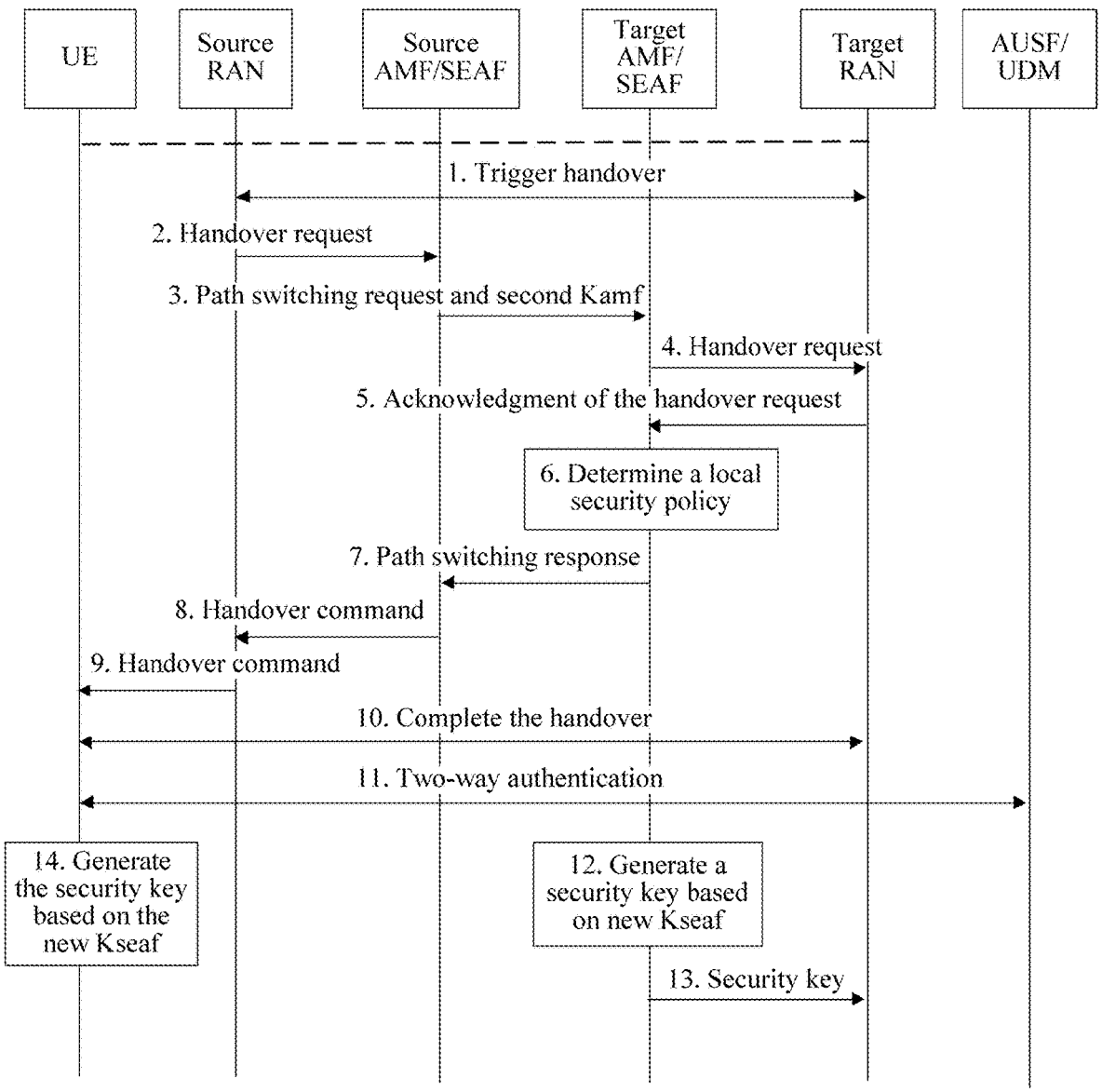
FIG. 7 is a schematic flowchart of yet another security implementation method according to an embodiment of the present disclosure.

Referring to FIG. 7, an embodiment of the present disclosure provides another security implementation method. When a UE needs to be handed over from a currently connected source RAN to a target RAN, network security may be implemented using the following method. The method may include, but is not limited to, the following steps.

1. The source RAN triggers communication handover.

2. The source RAN sends a handover request to a source AMF/source SEAF.

3. The source AMF/source SEAF sends a path switching request to a target AMF/target SEAF.

4. The target AMF/target SEAF sends a handover request to the target RAN.

5. The target RAN feeds back an acknowledgment message of the handover request to the target AMF/target SEAF.

6. The target AMF/target SEAF determines a local security policy.

The security policy may be preset in a local cache, or may be stored in another security network element (such as a Policy Control Function (PCF), a UDM, or an AUSF). The security policy instructs to determine whether the handover of the UE to the target RAN needs to be authenticated again. The target AMF/target SEAF queries the local cache for the security policy, or queries the other security network element for the security policy.

For example, the security policy may be determined based on the following implementation condition: a key on the source AMF/source SEAF side has expired or is no longer secure, or a security capability of the UE needs to be obtained again, but is not obtained using a security context transmitted by the source AMF/source SEAF side. Then, when a current status satisfies the implementation condition indicated by the security policy, the target AMF/target SEAF determines that the local security policy indicates that the handover of the UE to the target RAN needs to be authenticated again. Therefore, the target AMF/target SEAF continues to perform a subsequent step.

7. The target AMF/target SEAF feeds back a path switching response to the source AMF/source SEAF, where the path switching response does not carry a security context.

8. The source AMF/source SEAF feeds back a handover command to the source RAN, where the handover command does not carry a security context.

9. The source RAN sends the handover command to the UE, where the handover command does not carry a security context.

10. The UE and the target RAN complete a subsequent handover process.

11. The UE and an AUSF or a UDM perform two-way authentication.

After a communication connection of the UE is handed over from source RAN to the target RAN, the UE and an authentication network element perform two-way authentication, to verify validity of an identity of the UE. The authentication network element may be the AUSF, or may be the UDM. After the two-way authentication succeeds, both a UE side and a target AMF/target SEAF side obtain a new anchor key Kseaf.

12. The target AMF/target SEAF generates a security key based on new Kseaf.

It may be understood that, the target AMF/target SEAF generates the security key (KgNB of an AS key, and an NAS key) based on the new Kseaf, a network parameter shared in advance, and a security context, and stores the NAS key. For a detailed process, refer to the related descriptions in step 7, step 9, and step 10 in the embodiment in FIG. 5, and details are not described herein again.

It is to be noted that, the security context herein may be a result of obtaining an intersection of the security context transmitted from the source AMF/source SEAF side and a security context of the target AMF/target SEAF side. For example, the finally obtained security context may include an encryption algorithm ID, an integrity algorithm ID, the security capability of the user equipment, or the like.

13. The target AMF/target SEAF sends the security key to the target RAN, where the sent security key includes KgNB.

14. The UE generates the security key based on the new Kseaf. There is no mandatory sequence between this step and steps 12 and 13.

It may be understood that, the UE may alternatively generate the security key based on the new Kseaf, the network parameter shared in advance, and the security context. For a detailed process, refer to the related descriptions in step 7, step 9, and step 10 in the embodiment in FIG. 5, and details are not described herein again.

It is to be noted that, for a step not described in detail in the embodiment in FIG. 7, similarly refer to the related descriptions in the embodiments in FIG. 5 and FIG. 6.

It is to be further noted that, in this embodiment of the present disclosure, when a communications system performs AMF handover, SMFs corresponding to different AMFs may be different. Therefore, SMF handover may also occur in the foregoing process. In this case, security protection of a PDU session also needs to be considered. For example, after the two-way authentication described in step 11 succeeds, the AUSF similarly obtains a new key Left K, and the AUSF may generate a new PDU session key Ksmf, and send the new PDU session key Ksmf to an SMF. Details are not described herein again.

Authentication is performed again on a target side to obtain a new protection key, and forward security and backward security are satisfied. A source side does not need to transmit a key, and a protection key does not need to be generated based on an existing key either.

It can be learned that, during implementation of this embodiment of the present disclosure, after inter-AMF handover ends, the communications system may obtain a new protection key after the two-way authentication is performed again, and the source network side does not need to transmit an intermediate key, and an intermediate key does not need to be generated based on an original key either. For the network, the target RAN cannot obtain the security key used by the source RAN, and cannot decode communication information between the source RAN and the UE, thereby implementing backward security of network communication. The source RAN cannot obtain the security key used by the target RAN, and cannot decode communication information between the target RAN and the UE, thereby implementing forward security of network communication.

Figure 8:
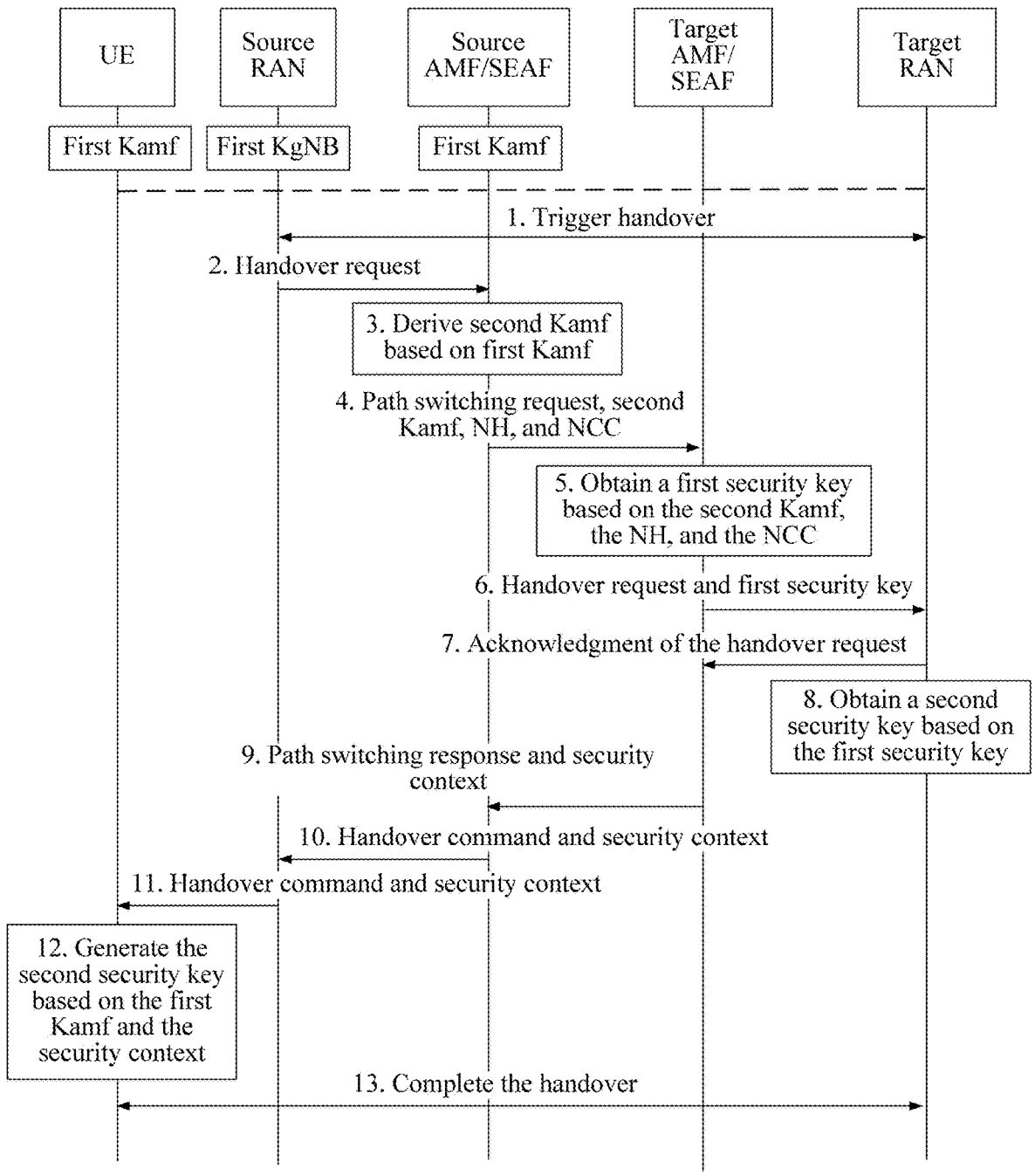
FIG. 8 is a schematic flowchart of still yet another security implementation method according to an embodiment of the present disclosure.

Referring to FIG. 8, an embodiment of the present disclosure provides another security implementation method. In an application scenario of this method, after a UE is authenticated on a network, a first key Kamf may be configured on a UE side and a source AMF/source SEAF, and first KgNB is configured on a source RAN side. When the UE needs to be handed over from a currently connected source RAN to a target RAN, network security may be implemented using the following method. The method may include, but is not limited to, the following steps.

1. The source RAN triggers communication handover.

2. The source RAN sends a handover request to the source AMF/source SEAF.

3. The source AMF/source SEAF derives second Kamf based on the first Kamf. For a detailed derivation process, refer to the description of step 3 in the embodiment in FIG. 6.

4. The source AMF/source SEAF sends a path switching request, the second Kamf, a first NH, and a first NCC to a target AMF/target SEAF.

In this embodiment of the present disclosure, a key KeNB is associated with an NH parameter and an NCC parameter, where NH indicates a next hop key, and NCC indicates a next hop chaining counter. Both the KeNB and the NH may be derived from another intermediate key (such as Kasme). In an initial establishment process, the KeNB is directly derived from the Kasme, and a value of the NCC is 0. Subsequently, when the KeNB needs to be updated, the KeNB may be updated based on a pair of {NH, NCC}.

In an embodiment, the source AMF/source SEAF determines a pair of {first NH, first NCC}, and separately sends {first NH, first NCC, second Kamf} and the path switching request to the target AMF/target SEAF.

In another embodiment, the source AMF/source SEAF determines a pair of {first NH, first NCC}, and separately sends the pair of {first NH, first NCC} and the second Kamf to the target AMF/target SEAF using the path switching request.

5. The target AMF/target SEAF generates a first security key based on the second Kamf, the first NH, and the first NCC.

During some implementations, the target AMF/target SEAF stores the received pair of {first NH, first NCC}, and derives a pair of {second NH, second NCC} based on the pair of {first NH, first NCC} and the second Kamf. One derivation process is as follows: second NH=KDF (second Kamf, first NH), and second NCC=first NCC+1.

In addition, the target AMF/target SEAF further derives Knasenc based on the second Kamf, a re-determined key protection algorithm, and a second parameter as follows: Knasenc=KDF (second Kamf, NAS confidentiality algorithm ID, count value Nonce, counter, random number, sequence number, or other parameters).

The target AMF/target SEAF further derives Knasint based on the second Kamf, the key protection algorithm, and a third parameter as follows: Knasint=KDF (second Kamf, NAS integrity algorithm ID, count value Nonce, counter, random number, sequence number, or other parameters).

It may be understood that, the first security key includes the pair of {second NH, second NCC}, the key Knasenc, and the key Knasint. Subsequently, the target AMF/target SEAF stores the key Knasenc and the key Knasint, and sends the pair of {second NH, second NCC} to an access network.

6. The target AMF/target SEAF sends a handover request and a pair of {second NH, second NCC} that is in the first security key to the target RAN, and correspondingly, the target RAN obtains and stores the pair of {second NH, second NCC}.

7. The target RAN sends an acknowledgment message of the handover request to the target AMF/target SEAF, to notify the target AMF/target SEAF that the pair of {second NH, second NCC} that is in the first security key has been successfully obtained.

8. The target RAN generates a second security key based on the first security key.

During some implementations, the target RAN generates second KgNB based on the pair of {second NH, second NCC}, and a parameter such as a physical identifier of the target RAN as follows: second KgNB=KDF (second NH, physical identifier, other parameters).

It may be understood that, after obtaining the second KgNB, the target RAN may continue to derive specific AS keys such as a key Krrcenc, a key Krrcint, a key Kupenc, and a key Kupint based on a security protection algorithm and the second KgNB.

9. The target AMF/target SEAF feeds back a path switching response and a security context to the source AMF/source SEAF.

10. The source AMF/source SEAF feeds back a handover command and the security context to the source RAN.

11. The source RAN feeds back the handover command and the security context to UE.

12. The UE generates a security key based on the first Kamf and the security context.

It is to be noted that, the security context received on a UE side needs to include only a parameter that the UE side does not have when keys are generated on a network side, for example, a random number, a timestamp, a security protection algorithm identifier, or {first NH, first NCC}. The UE may already have, in the foregoing steps, another parameter used for generating the keys.

It may be understood that, after the UE is originally authenticated on the network, the first Kamf is already configured for the UE, and the UE has shared a network parameter on the network side in advance. Therefore, the UE may generate an NAS key based on the first Kamf, the network parameter, and the security context. In addition, the UE may further obtain {second NH, second NCC} based on {first NH, first NCC} and the first Kamf, generate the second KgNB based on {second NH, second NCC}, and the parameter such as the physical identifier of the target RAN, and then derive a specific AS key based on the second KgNB.

13. The UE and the target RAN complete a subsequent handover process.

It can be learned that, during implementation of this embodiment of the present disclosure, in an implementation process of inter-AMF handover, a target side (such as the target RAN or the target AMF/target SEAF) generates a security key of the target side based on the keys KgNB and Kamf of a source side (such as the source RAN or the source AMF/source SEAF). For the network, the target RAN cannot obtain the security key used by the source RAN, and cannot decode communication information between the source RAN and the UE, thereby implementing backward security of network communication.

It is to be noted that, in some of the foregoing embodiments of the present disclosure, when a communications system performs AMF handover, SMFs corresponding to different AMFs may be different. Therefore, SMF handover may also occur in the foregoing process. In this case, security protection of a PDU session also needs to be considered.

In an AMF handover procedure, update of a PDU session key needs to be considered on the target side. During some implementations, the target AMF/target SEAF sends indication information to the AUSF, to trigger the AUSF to generate a new PDU session key. For example, a key Left K may be pre-stored in the AUSF. Therefore, the AUSF may generate the new PDU session key Ksmf based on the Left K, and UE-related information and session information (such as a session ID and slice information) that are sent by the target AMF/target SEAF: Ksmf=KDF (Left K, NAI, NSSAI, slice ID, AMF-related parameter, SMF-related parameter, count value Nonce, counter, random number, sequence number, or other parameters).

Then, the AUSF sends the Ksmf to the SEAF or the target AMF, the SEAF or the target AMF forwards the Ksmf to the target SMF and the UE, and the target SMF/the UE uses the Ksmf to update the PDU session key.

Figure 9:
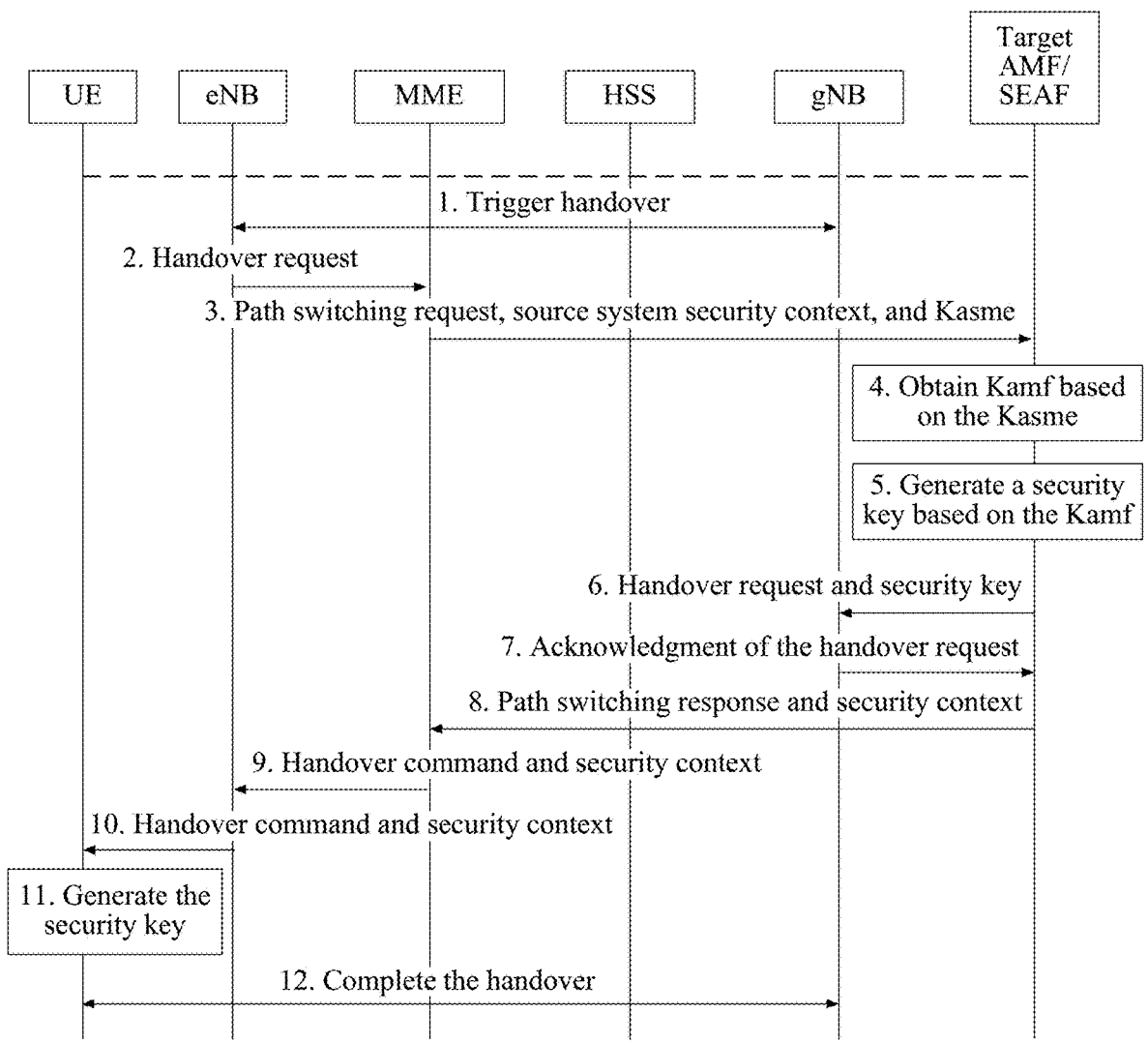
FIG. 9 is a schematic flowchart of a further security implementation method according to an embodiment of the present disclosure.

The security implementation method provided in this embodiment of the present disclosure not only may be applied to a scenario of inter-RAN/inter-AMF handover in a same communications system, but also may be applied to a scenario of handover between NodeBs (an eNB and a gNB) or between access and management network elements (an MME and an AMF) in different communications systems. Referring to FIG. 9, an embodiment of the present disclosure provides another security implementation method. The method may be applied to handover processes in different communications systems. For example, a UE originally establishes a communication connection in a first communications system, and later the UE needs to hand over the communication connection to a second communications system (for example, a mobile phone is handed over from an LTE communications system to a 5G communications system) based on a user requirement or a current network status. In a possible implementation, the first communications system (the LTE communications system) includes: an eNB located on an access network, an MME and an HSS located on a core network, and the like. The second communications system (the 5G communications system) includes: a gNB located on the access network, a target AMF/target SEAF and an AUSF located on the core network, and the like. When the UE needs to be handed over from the currently connected eNB to the gNB, network security may be implemented using the following method. The method may include, but is not limited to, the following steps.

1. The eNB triggers communication handover.

For example, the eNB may trigger the communication handover based on factors such as a requirement of the UE, motion of the UE, and a current network status.

2. The eNB sends a handover request to the MME.

The eNB sends a Handover Required message to the MME, to notify the MME that a user needs to perform handover, where the Handover Required message carries an identifier of the UE.

3. The MME sends a path switching request, a source system security context, and an intermediate key Kasme to the target AMF/target SEAF.

The source system security context is a security context of the first communications system. For example, the security context of the first communications system may include: a lifetime of a security-related key in the first communications system, a key index, a security capability of the UE, an integrity algorithm, an integrity algorithm identifier, an encryption algorithm, an encryption algorithm identifier, or a counter related to key calculation. The security context may also include a specific key. The security capability of the UE may be a list of encryption and integrity algorithms supported by the UE, a key length or a key lifetime that is required by the UE, or the like.

The intermediate key Kasme is an upper-layer key generated after authentication in the first communications system, and is used for deriving a lower-layer access stratum key and a lower-layer non-access stratum key.

In an embodiment, the path switching request sent by the MME to the AMF/SEAF on a target side carries the security context of the first communications system and the intermediate key Kasme.

In another embodiment, the MME separately sends the path switching request, the security context of the first communications system, and the intermediate key Kasme to the target AMF/SEAF.

4. The target AMF/target SEAF obtains Kamf based on the Kasme.

In an embodiment, the AMF/SEAF derives the Kamf based on the intermediate key Kasme and a network parameter. An example is as follows: Kamf=KDF (Kamf, target side ID, slice ID, NAI, NSSAI, AMF region identifier, GUAMI, AMF pointer, AMF setting identifier, count value Nonce, counter, random number, sequence number, or other parameters).

In addition, during some implementations, the AMF/SEAF may further derive the Kamf using the Kasme, the security context of the first communications system (for example, using the security capability of the UE), the network parameter, and the like.

5. The target AMF/target SEAF generates a security key based on the Kamf.

In an embodiment, the target AMF/target SEAFF may determine a key protection algorithm of the second communications system based on a preset rule. For example, a 5G algorithm priority list is preset in the target AMF/target SEAF, and the algorithm priority list includes a plurality of algorithm IDs. The target AMF searches the algorithm priority list, and selects a 5G NAS algorithm based on the algorithm priority list, to obtain an NAS confidentiality algorithm ID and an NAS integrity algorithm ID.

It may be understood that, the target AMF/target SEAF may derive an AS key and an NAS stratum-related key, for example, KgNB, Knasenc, and Knasint, based on the Kamf; and the target AMF/target SEAF stores the Knasenc and the Knasint. For a detailed process, refer to the description of step 9 in FIG. 5, and details are not described herein again.

6. The target AMF/target SEAF sends a handover request and the security key to the gNB, where the security key sent herein includes KgNB. Correspondingly, the gNB obtains the KgNB.

In an embodiment, the target AMF/target SEAF sends the handover request to the gNB, where the handover request carries the key KgNB.

It is to be noted that, if the count value Nonce or the counter is used in the foregoing process of generating the key in step 4 and step 5, the handover request further carries the count value Nonce or the counter, such that a UE side can correctly generate the key.

In this embodiment of the present disclosure, when the second communications system supports user plane integrity protection, the gNB needs to determine whether a user plane integrity protection key needs to be generated and enabled. For example, the gNB may determine this based on a pre-stored policy, or the gNB may determine this by negotiation with a network element such as an SMF or an AMF, or the gNB may determine this based on a security context of the second communications system, where the security context includes information indicating whether integrity protection is enabled. When determining that the user plane protection is supported, the gNB continues to generate a subsequent AS key such as the key Krrcenc, the key Krrcint, the key Kupenc, or the key Kupint based on the KgNB.

7. The gNB sends an acknowledgment message of the handover request to the target AMF/target SEAF.

8. The target AMF/target SEAF sends a path switching request and a security context to the MME.

If the count value Nonce or the counter is used in the foregoing process of generating the key, the security context includes the count value Nonce or the counter.

9. The MME sends a handover command and the security context to the eNB.

10. The eNB sends the handover command and the security context to the UE.

11. The UE generates the security key.

It is to be noted that, the security context received on a UE side needs to include only a parameter that the UE side does not have when keys are generated on a network side, for example, a random number (the count value Nonce or the counter), a timestamp, or a 5G-related security protection algorithm identifier. The UE may already have, in the foregoing steps, another parameter used for generating the keys.

The UE may obtain the Kasme from the first communications system. Therefore, for the UE, the UE may similarly generate a new NAS key and a new AS key based on the Kasme, the network parameter, the security context, and the like. For example, the UE may first generate the Kamf based on the Kasme, and then generate the AS key (such as the Krrcenc, the Krrcint, the Kupenc, or the Kupint) and the NAS key (such as the Knasenc or the Knasint) based on the Kamf, the network parameter, and the security context. Details are not described herein again.

12. The UE and the gNB complete a subsequent handover process, such that a communication connection of the UE is finally handed over from the eNB to the gNB.

It needs to be noted that, in the embodiment in FIG. 9, in some implementations, the Kasme may not be transmitted in step 3, and step 4 may be canceled. Then, before step 5, the AUSF generates a new Kseaf of the target side based on a ciphering key (CK)/an integrity key (IK) of the target side and a source system security context that is transmitted by the MME, and sends the new Kseaf to the target AMF/target SEAF. Then, the target AMF/target SEAF generates a subsequent key, such as the Kamf, based on the new Kseaf and a security protection algorithm of the first communications system (such as 5G).

It is to be further noted that, in some implementations, the Kasme may not be transmitted in step 3, and step 4 may be canceled. Then, before step 5, the HSS calculates a key Klte based on a parameter of the HSS, for example, a CK/an IK or a NONCE, and transmits the Klte to the AUSF, and then the AUSF generates the Kseaf and Left K based on the Klte. For example, Kseaf=KDF (Klte, serving network name identifier, count value Nonce, counter, random number, sequence number, or other parameters). The AUSF sends the Kseaf to the target AMF/target SEAF, and then the target AMF/target SEAF generates a subsequent key, such as the Kamf, based on the Kseaf and the security protection algorithm of the first communications system (such as 5G).

It can be learned that, during implementation of this embodiment of the present disclosure, in an implementation process of inter-communications-system handover, a communications system on the target side may correspondingly generate a security key using an intermediate key and a security context of a communications system on a source side, to perform security protection on the communication in the communications system after the handover. For the network, the communications system on the target side cannot obtain the security key used by the communications system on the source side, and cannot decode communication information between the communications system on the source side and the UE, thereby implementing backward security of network communication.

Figure 10:
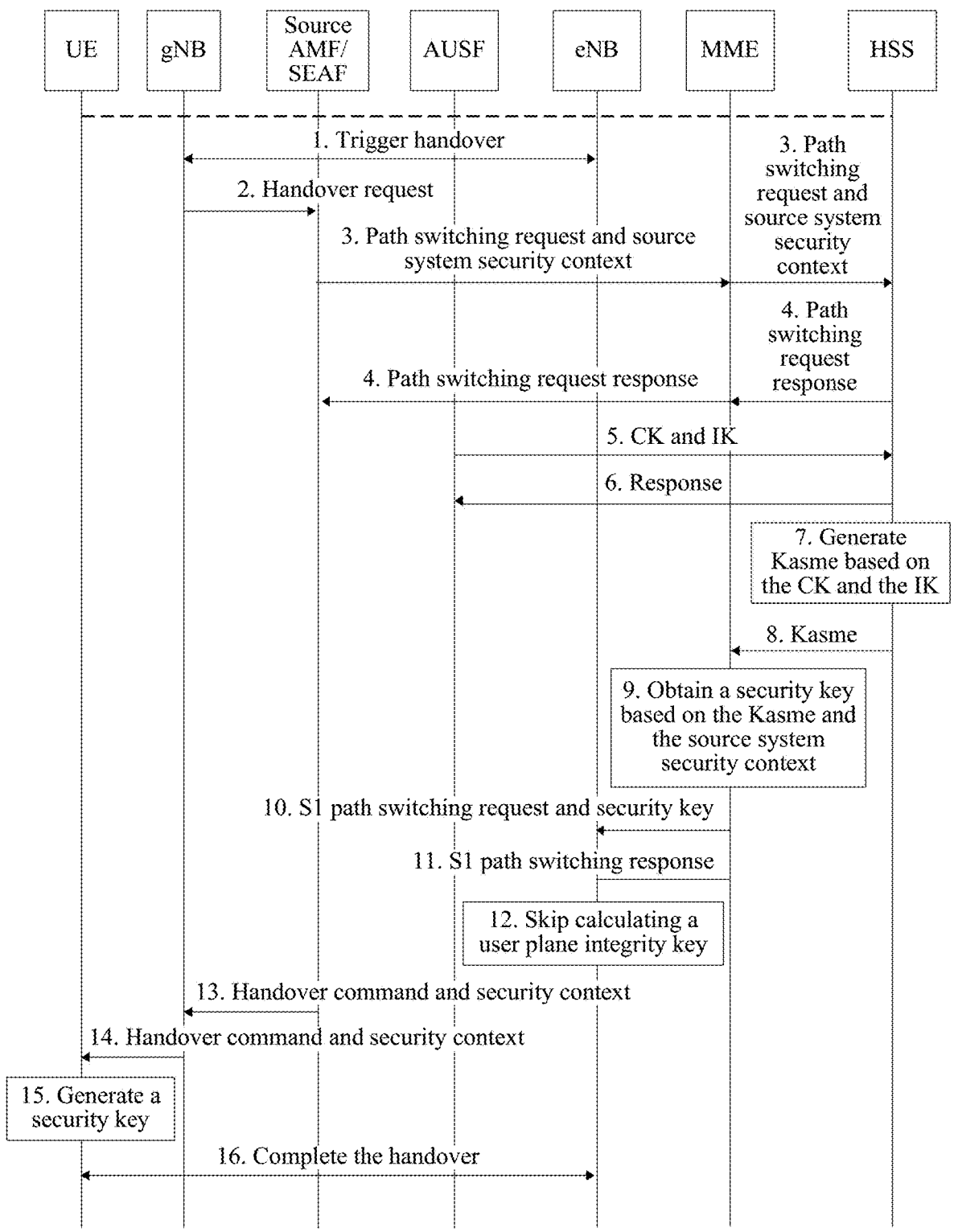
FIG. 10 is a schematic flowchart of a still further security implementation method according to an embodiment of the present disclosure.

Referring to FIG. 10, an embodiment of the present disclosure provides another security implementation method. The method may be applied to handover processes in different communications systems. For example, a UE originally establishes a communication connection in a second communications system, and later the UE needs to hand over the communication connection to a first communications system (for example, a mobile phone is handed over from a 5G communications system to an LTE communications system) based on a user requirement and a current network status. In a possible implementation, the first communications system (the LTE communications system) includes: an eNB located on an access network, an MME and an HSS located on a core network, and the like. The second communications system (the 5G communications system) includes: a gNB located on the access network, a target AMF/target SEAF and an AUSF located on the core network, and the like. When the UE needs to be handed over from the currently connected gNB to the eNB, network security may be implemented using the following method. The method may include, but is not limited to, the following steps.

1. The gNB triggers communication handover.

For example, the eNB may trigger the communication handover based on one or more factors such as a requirement of the UE, motion of the UE, a current network status, or the like.

2. The gNB sends a handover request to a source AMF/source SEAF, to notify the source AMF/source SEAF that a user needs to perform handover.

3. The source AMF/source SEAF sends a path switching request and a source system security context to the MME, and the MME sends a handover request and the source system security context to the HSS.

The source system security context is a security context of the second communications system. For example, the security context of the second communications system may include: a lifetime of a security-related key in the second communications system, a key index, a security capability of the UE, an integrity algorithm, an integrity algorithm identifier, an encryption algorithm, an encryption algorithm identifier, or a counter related to key calculation. The security context may also include a specific key and information indicating whether integrity is enabled.

In an embodiment, the path switching request sent by the source AMF/source SEAF to the MME carries the security context.

4. The HSS feeds back a path switching request response to the MME, and the MME feeds back the path switching request response to the source AMF/source SEAF.

5. The AUSF sends a CK and an IK to the HSS.

In an embodiment of the present disclosure, to satisfy a security requirement of an LTE system after the handover, the AUSF may be configured to generate an integrity key (IK) and a ciphering key (CK) that are needed by the HSS, and send the CK and the IK to the HSS.

6. The HSS sends a response to the AUSF, to notify the AUSF that the CK and the IK are successfully received.

7. The HSS generates Kasme based on the CK and the IK.

In an embodiment, that the HSS further derives the intermediate key Kasme that suits the first communications system based on the obtained CK and IK may be as follows: Kasme=KDF (CK, IK, serving network name identifier, sequence number (SQN), other parameters).

8. The HSS sends the generated Kasme to the MME, and correspondingly the MME obtains the Kasme.

9. The MME generates a security key based on the Kasme and the security context.

In an embodiment, the MME may generate the security key (including a key KeNB and an NAS key) based on a parameter, such as the Kasme, the security capability of the UE, and a security capability of a network side, and the MME may store the NAS key. For example, the security capability of the UE may be a list of encryption and integrity algorithms supported by the UE, and a key length or a key lifetime that is required by the UE. For example, the security capability of the network side may be a list of encryption and integrity algorithms that are supported by a network and configured in advance in a network device on the network side, a priority list of encryption and integrity algorithms supported by an operator, a key length or a key lifetime supported by the network device/the operator, or the like.

During some implementations, a process of generating the key KeNB may be as follows: KeNB=KDF (new NAS count value, NAS count value length, algorithm identifier, other parameters).

10. The MME sends an S1 path switching request and the security key to the eNB, where the sent security key includes the KeNB.

An S1 interface is an interface between the eNB and the MME. In an embodiment, the MME sends a path switching request to the eNB using the S1 interface, where the path switching request may carry the KeNB. In another embodiment, the MME separately sends a path switching request and the KeNB to the eNB using the S1 interface.

11. The eNB feeds back an S1 path response to the MME, to notify the MME that the message has been successfully received.

12. The eNB does not calculate a user plane integrity key.

In this embodiment of the present disclosure, when the first communications system (LTE) does not support user plane integrity protection, the eNB determines that a user plane integrity protection key does not need to be generated and enabled. In this case, if the received security key includes the user plane integrity protection key, the eNB does not enable the key. In addition, in a process in which the eNB generates an AS key based on the received key KeNB, a user plane integrity protection key of an AS is no longer generated.

13. The source AMF/source SEAF feeds back a handover command and the security context to the gNB.

14. The gNB sends the handover command and the security context to the UE.

15. The UE generates a security key.

It is to be noted that, the security context received by a UE side needs to include only a parameter that the UE side does not have when keys are generated on the network side, for example, a random number (the count value Nonce or the counter), a timestamp, or an LTE-related security protection algorithm identifier. The UE may already have, in the foregoing steps, another parameter used for generating the keys. The UE may derive Kasme based on preset Kamf, and obtain a corresponding AS key and a corresponding NAS key based on the Kasme, a network parameter, the security context, and the like.

16. The UE and the eNB complete a subsequent handover process, such that a communication connection of the UE is finally handed over from the gNB to the eNB.

It should be noted that, in the embodiment in FIG. 10, in some implementations, step 5 and step 6 may be omitted. In step 7, the HSS may generate the intermediate key Kasme based on the pre-stored CK/IK and the received source system (the second system) security context. In step 9, the MME may generate the KeNB and the NAS key based on the Kasme and the security protection algorithm (such as 5G) of the first system.

It is to be further noted that, in another possible implementation, the AMF may send the Kamf to the MME, and the MME may derive the Kasme based on the Kamf in the following derivation manners.

First derivation manner: Kasme=KDF (Kamf, target side ID, serving network name identifier, count value Nonce or counter or random number Random or sequence number, NAS count).

Second derivation manner: Kasme=KDF (Kamf, Kasme in the first derivation, other parameters).

It can be learned that, during implementation of this embodiment of the present disclosure, in an implementation process of inter-communications-system handover, a communications system on the target side may correspondingly generate a security key using an intermediate key and a security context of a communications system on a source side, to perform security protection on the communication in the communications system after the handover. For the network, the communications system on the target side cannot obtain the security key used by the communications system on the source side, and cannot decode information communicated between the communications system on the source side and the UE, thereby implementing backward security of network communication.

Figure 11:
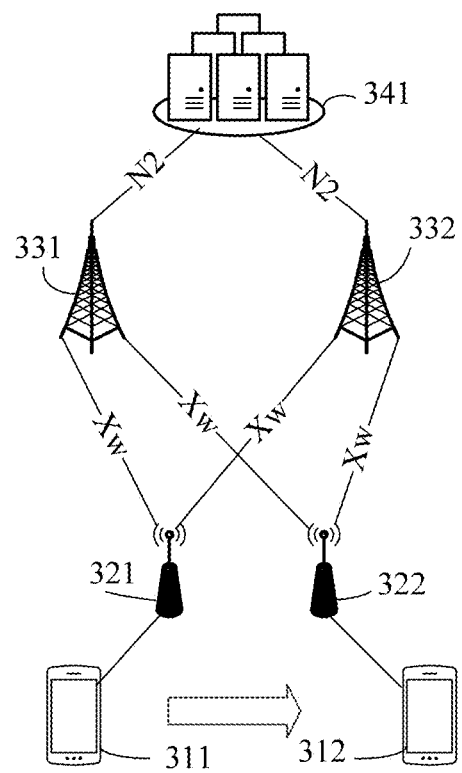
FIG. 11 is a schematic diagram of a scenario of a 5G+WLAN system according to an embodiment of the present disclosure.

Referring to FIG. 11, based on a same disclosure idea, an embodiment of the present disclosure provides an application scenario of communication handover in a communications system that combines a 5G network and a WLAN network. The 5G network includes an access network and a core network. The access network includes a RAN device 331 and a RAN device 332, and the core network includes a core network device group 341. The access network devices are separately connected to core network devices using an N2 interface. The WLAN network includes a wireless node 321, a wireless node 322, and user equipment that establishes a communication connection to a wireless node (the wireless node may also be considered as a part of the access network). The wireless node may be separately connected to the RAN device 331 and the RAN device 332 using an Xw interface. Uplink communication or downlink communication is performed between the user equipment and the wireless node using a WLAN technology.

In an example communication scenario, the user equipment is in communication connection with the wireless node 321. If the user equipment moves from a location 311 to a location 312, the user equipment may need to hand over a communication connection from the wireless node 321 to the wireless node 322. After a handover process is completed, the user equipment is in communication connection with the wireless node 322, and then communication can continue. In this process, a process of the communication handover may be accompanied with communication handover of a RAN device.

In this scenario, the security implementation method provided in the embodiments of the present disclosure may also be used to perform security protection on the communication after the handover. For example, the following steps may be included.

1. The RAN device 332 receives a request for handing over the user equipment from the wireless node 321 to the wireless node 322 to perform communication.

In this embodiment of the present disclosure, for example, the wireless node may be a WLAN termination, a radio access point (AP), a wireless router, or the like. For example, the RAN device may be a base station device such as a gNB.

2. The RAN device 332 obtains a master key.

In an embodiment, the RAN device 332 may obtain the master key in the following manner.

The core network device group 341 generates an intermediate key KgNB, and sends the KgNB to the RAN device 332.

The RAN device 332 generates the master key based on the KgNB, for example, when the wireless node is a WLAN termination.

The RAN device 332 derives a master key S-Kwt based on the KgNB and the WLAN termination counter (WT counter) as follows: S-Kwt=KDF (KgNB, WT counter, other parameters).

3. The RAN device 332 sends the master key to the wireless node 322 using the Xw interface, where the S-Kwt is an air interface protection key of the WLAN, and the wireless node 322 generates a final security key based on the master key S-Kwt and the IEEE 802.11 standard, where the security key is used for protecting communication between the user equipment and the wireless node 322 after the user equipment is handed over from the wireless node 321 to the wireless node 322.

4. The RAN device 332 sends a WLAN termination counter (WT counter) to the user equipment using an air interface message, such as an RRC signaling message, between the RAN device 332 and the UE, such that the user equipment can also calculate the corresponding S-Kwt, and then generate the security key based on the S-Kwt and the IEEE standard.

The foregoing describes the methods in the embodiments of the present disclosure in detail. To help better implement the foregoing solutions in the embodiments of the present disclosure, the following provides related apparatuses in the embodiments of the present disclosure.

Figure 12:
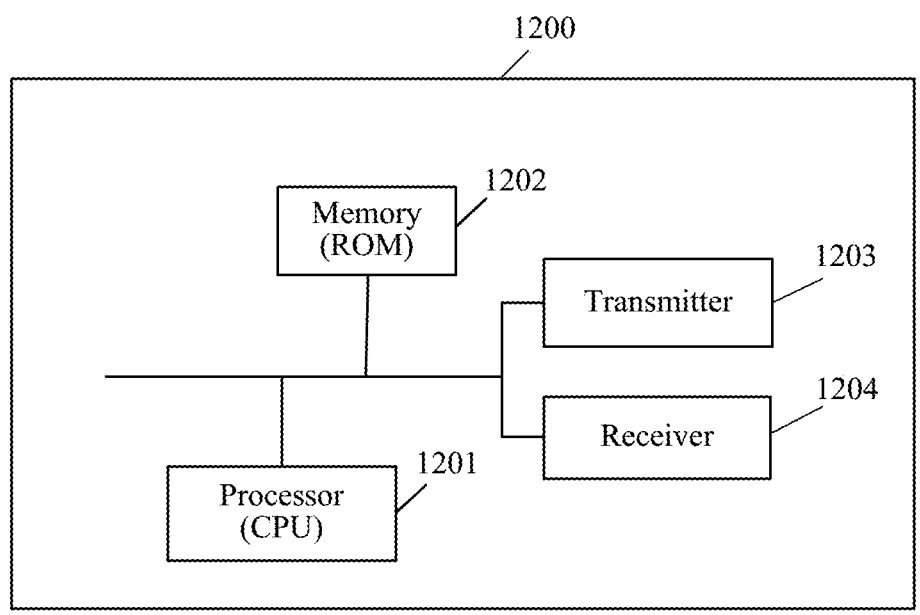
FIG. 12 is a schematic structural diagram of an apparatus according to an embodiment of the present disclosure.

Referring to FIG. 12, an embodiment of the present disclosure provides an apparatus 1200. The apparatus 1200 includes a processor 1201, a memory 1202, a transmitter 1203, and a receiver 1204. The processor 1201, the memory 1202, the transmitter 1203, and the receiver 1204 are connected to each other (for example, connected to each other using a bus).

The memory 1202 includes, but is not limited to, a random access memory (RAM), a read-only memory (ROM), an erasable programmable read only memory (EPROM), or a compact disc read-only memory (CD-ROM). The memory 1202 is configured to store a related instruction and related data.

The transmitter 1203 is configured to transmit data, and the receiver 1204 is configured to receive data.

The processor 1201 may be one or more central processing units 1201 (CPUs), and when the processor 1201 is one CPU, the CPU may be a single-core CPU, or may be a multi-core CPU.

The processor 1201 is configured to read program code stored in the memory 1202, to implement functions of the authentication network element in the embodiment in FIG. 3.

When the apparatus 1200 is a first network element, the program code stored in the memory 1202 may be used for implementing functions of the first network element in the embodiment in FIG. 4. Detailed descriptions are as follows.

The receiver 1204 is configured to receive a request for handing over a user equipment from a source access network device to a target access network device to perform communication.

The processor 1201 is configured to obtain a security key. The security key is used for protecting communication between the user equipment and a target network after the user equipment is handed over from the source access network device to the target access network device, where the target network includes the target access network device and a target core network device, and the target core network device includes the first network element.

The transmitter 1203 is configured to send the security key to the target access network device.

In an embodiment, the processor 1201 is configured to obtain a security key. For example, the processor 1201 is configured to obtain a first intermediate key, where the first intermediate key is an upper-layer key generated after authentication, and is used for deriving a lower-layer access stratum (AS) key and a lower-layer non-access stratum (NAS) key. The processor 1201 is configured to determine a security protection algorithm, and derive the security key based on the security protection algorithm and the first intermediate key.

In an embodiment, the processor 1201 is configured to obtain a first intermediate key using the receiver 1204, where the first intermediate key is derived by a security anchor function SEAF based on an anchor key and a network parameter.

In an embodiment, the processor 1201 is configured to obtain a first intermediate key using the receiver 1204, where the first intermediate key is derived by a second network element based on a second intermediate key and a network parameter, and the second intermediate key is an upper-layer key generated after authentication and is used for deriving a lower-layer access stratum key and a lower-layer non-access stratum key.

In an embodiment, the processor 1201 is configured to obtain a first intermediate key by receiving, using the receiver 1204, the second intermediate key sent by a second network element, and the processor 1201 is configured to derive the first intermediate key based on the second intermediate key and a network parameter, where the second intermediate key is an upper-layer key generated after authentication, and is used for deriving a lower-layer access stratum key and a lower-layer non-access stratum key.

In an embodiment, the processor 1201 is configured to obtain a first intermediate key such that after the user equipment is handed over from the source access network device to the target access network device, and two-way authentication on the user equipment succeeds again, the processor 1201 obtains an anchor key, and the processor 1201 is configured to derive the first intermediate key based on the anchor key and a network parameter.

In an embodiment, the receiver 1204 is further configured to receive a next hop key, namely, a first NH, and a next hop chaining counter, namely, a first NCC, where the first NH and the first NCC are sent by the second network element. The processor 1201 is further configured to obtain a second NH and a second NCC based on the first NH and the first NCC. The transmitter 1203 is further configured to send the second NH and the second NCC to the target access network device.

In an embodiment, the security key includes a first key, a second key, and a third key, where the first key is an intermediate key for security protection between the user equipment and the target access network device, the second key is an NAS signaling encryption protection key, and the third key is an NAS signaling integrity protection key.

That the processor 1201 is configured to determine a security protection algorithm, and derive the security key based on the security protection algorithm and the first intermediate key comprises: including, by the security protection algorithm, an NAS confidentiality algorithm identifier and an NAS integrity algorithm identifier. Additionally, the processor 1201 is configured to derive the first key based on a first parameter, where the first parameter includes one or more of the first intermediate key, a target cell identifier, a frequency channel number, an NAS count value, an NAS connection identifier, and a counter or a random number or a sequence number; the processor 1201 is configured to derive the second key based on a second parameter, where the second parameter includes one or more of the first intermediate key, the NAS confidentiality algorithm identifier, and a counter or a random number or a sequence number. The processor 1201 is further configured to derive the third key based on a third parameter, where the third parameter includes one or more of the first intermediate key, the NAS integrity algorithm identifier, and a counter or a random number or a sequence number.

The transmitter 1203 is configured to send the security key to the target access network device, which may include the transmitter 1203 sending the first key to the target access network device.

In an embodiment, the source access network device is an access network device in a first communications system, the target access network device is an access network device in a second communications system, and the first network element is a network element in the second communications system. The request includes a security context of the first communications system, and a third intermediate key. The third intermediate key is an upper-layer key generated after authentication in the first communications system, and is used for deriving a lower-layer access stratum key and a lower-layer non-access stratum key.

The processor 1201 is configured to obtain a first intermediate key. For example, the processor 1201 is configured to derive the first intermediate key based on the security context of the first communications system, a security context of the second communications system, and the third intermediate key.

In an embodiment, the first network element includes a target access and mobility management function (AMF), the second network element includes a source AMF, the target AMF is connected to the target access network device, and the source AMF is connected to the source access network device. Alternatively, the first network element includes a target security anchor function (SEAF), the second network element includes a source SEAF, the target SEAF is connected to the target access network device, and the source SEAF is connected to the source access network device.

In an embodiment, the network parameter includes one or more of a target side identifier, a slice identifier, an NAI, NSSAI, an AMF region identifier, an AMF setting identifier, a GUAMI, an AMF pointer, an AMF set identifier, a counter, a random number, or a sequence number.

In an embodiment, the first network element includes a mobility management entity (MME) network element in a first communications system, the target access network device is an access network device in the first communications system, and the source access network device is an access network device in a second communications system.

The receiver 1204 of the MME is configured to receive a request for handing over the user equipment from the source access network device to the target access network device to perform communication, where the request includes a security context of the second communications system.

The processor 1201 of the MME is configured to obtain a security key.

The transmitter 1203 of the MME is configured to send the security key to the target access network device.

In an embodiment, the processor 1201 of the MME is configured to receive, using the receiver 1204 of the MME, a third intermediate key, where the third intermediate key is derived by a home subscriber server (HSS) in the first communications system based on a first ciphering key, a first integrity protection key, a serving network name identifier, and a sequence number (SQN). Further, the third intermediate key is an upper-layer key generated after authentication in the first communications system, and is used for deriving a lower-layer access stratum key and a lower-layer non-access stratum key.

The processor 1201 of the MME is configured to derive the security key based on a security context of the second communications system and the third intermediate key.

In an embodiment, the processor 1201 of the MME is configured to obtain a security key such that the processor 1201 of the MME receives, using the receiver 1204 of the MME, a first intermediate key sent by an AMF in the second communications system, where the first intermediate key is an upper-layer key generated after authentication in the second communications system, and is used for deriving a lower-layer access stratum AS key and a non-access stratum NAS key. The processor 1201 of the MME is configured to derive the third intermediate key based on the first intermediate key, the processor 1201 of the MME is configured to derive the security key based on a security context of the second communications system and the third intermediate key.

It is to be noted that, when the apparatus 1200 is the first network element, for a step performed by the processor 1201 and another technical feature that is provided by the processor 1201, further refer to corresponding descriptions in the method embodiments shown in FIG. 5 to FIG. 10, and details are not described herein again.

When the apparatus 1200 is the target access network device, the program code stored in the memory 1202 may be used for implementing functions of the RAN device 332 in the embodiment in FIG. 11. Detailed descriptions are as follows.

The receiver 1204 is configured to receive a request for handing over user equipment from a source wireless node to a target wireless node to perform communication.

The receiver 1204 is further configured to receive a first key (such as KeNB or KgNB) sent by a core network device, where the first key is an intermediate key for security protection between the user equipment and the target access network device.

The processor 1201 is configured to generate a second key (a master key) based on the intermediate key, where the second key is an intermediate key for security protection between the user equipment and the target wireless node.

The transmitter 1203 is configured to send the second key to the target wireless node, such that the target wireless node generates a security key based on the second key, where the security key is used for protecting the communication between the user equipment and the target wireless node after the user equipment is handed over from the source wireless node to the target wireless node.

It is to be noted that, when the apparatus 1200 is the first network element, for a step performed by the processor 1201 and another technical feature that is provided by the processor 1201, further refer to corresponding descriptions in the method embodiment shown in FIG. 11, and details are not described herein again.

Figure 13:
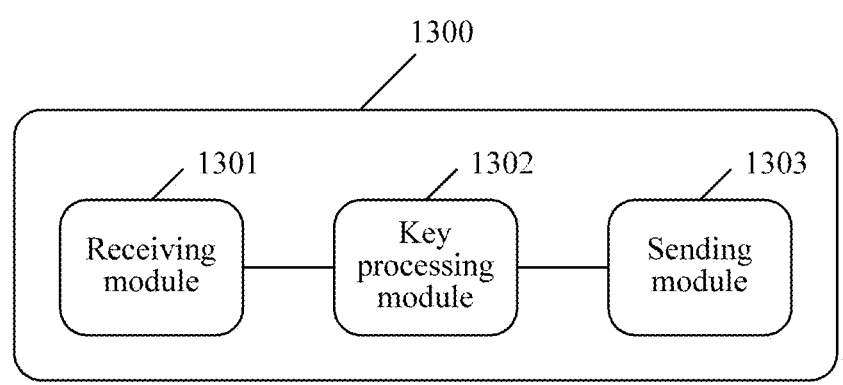
FIG. 13 is a schematic structural diagram of another apparatus according to an embodiment of the present disclosure.

Referring to FIG. 13, based on similar concepts disclosed herein, an embodiment of the present disclosure provides another apparatus 1300. The apparatus 1300 is a first network element, and may include a receiving module 1301, a key processing module 1302, and a sending module 1303. Descriptions are as follows.

The receiving module 1301 is configured to receive a request for handing over user equipment from a source access network device to a target access network device to perform communication.

The key processing module 1302 is configured to obtain a security key. The security key is used for protecting communication between the user equipment and a target network after the user equipment is handed over from the source access network device to the target access network device, where the target network includes the target access network device and a target core network device, and the target core network device includes the first network element.

The sending module 1303 is configured to send the security key to the target access network device.

In an embodiment, the key processing module 1302 obtains a first intermediate key, where the first intermediate key is an upper-layer key generated after authentication, and is used for deriving a lower-layer AS key and a lower-layer NAS key.

The key processing module 1302 determines a security protection algorithm, and derives the security key based on the security protection algorithm and the first intermediate key.

In an embodiment, the first network element obtaining a first intermediate key includes obtaining, by the key processing module 1302 using the receiving module 1301, the first intermediate key, where the first immediate key is derived by a security anchor function (SEAF) based on an anchor key and a network parameter.

In an embodiment, the key processing module 1302 obtaining a first intermediate key includes obtaining, by the key processing module 1302 using the receiving module 1301, the first intermediate key, where the first intermediate key is derived by a second network element based on a second intermediate key and a network parameter, and the second intermediate key is an upper-layer key generated after authentication and is used for deriving a lower-layer access stratum key and a lower-layer non-access stratum key.

In an embodiment, the key processing module 1302 obtaining a first intermediate key includes receiving, by the receiving module 1301, the second intermediate key sent by a second network element, and deriving, by the key processing module 1302, the first intermediate key based on the second intermediate key and a network parameter, where the second intermediate key is an upper-layer key generated after authentication, and is used for deriving a lower-layer access stratum key and a lower-layer non-access stratum key.

In an embodiment, the key processing module 1302 obtains a first intermediate key such that after the user equipment is handed over from the source access network device to the target access network device, and two-way authentication on the user equipment succeeds again, the key processing module 1302 obtains an anchor key and derives the first intermediate key based on the anchor key and a network parameter.

In an embodiment, the key processing module 1302 further obtains, using the receiving module 1301, a next hop key, namely, a first NH, and a next hop chaining counter, namely, a first NCC, where the first NH and the first NCC are sent by a second network element.

The key processing module 1302 obtains a second NH and a second NCC based on the first NH and the first NCC.

The sending module 1303 sends the second NH and the second NCC to the target access network device.

In an embodiment, the security key includes a first key, a second key, and a third key, where the first key is an intermediate key for security protection between the user equipment and the target access network device, the second key is an NAS signaling encryption protection key, and the third key is an NAS signaling integrity protection key.

In an embodiment, the key processing module 1302 determining a security protection algorithm and deriving the security key based on the security protection algorithm and the first intermediate key comprises including, by the security protection algorithm, an NAS confidentiality algorithm identifier and an NAS integrity algorithm identifier; deriving, by the key processing module 1302, the first key based on a first parameter, where the first parameter includes one or more of the first intermediate key, a target cell identifier, a frequency channel number, an NAS count value, an NAS connection identifier, and a counter or a random number or a sequence number; deriving, by the key processing module 1302, the second key based on a second parameter, where the second parameter includes one or more of the first intermediate key, the NAS confidentiality algorithm identifier, and a counter or a random number or a sequence number; and deriving, by the key processing module 1302, the third key based on a third parameter, where the third parameter includes one or more of the first intermediate key, the NAS integrity algorithm identifier, and a counter or a random number or a sequence number.

The sending module 1303 sending the security key to the target access network device includes sending, by the sending module, the first key to the target access network device.

In an embodiment, the source access network device is an access network device in a first communications system, the target access network device is an access network device in a second communications system, and the first network element is a network element in the second communications system. The request includes a security context of the first communications system, and a third intermediate key. The third intermediate key is an upper-layer key generated after authentication in the first communications system, and is used for deriving a lower-layer access stratum key and a lower-layer non-access stratum key.

In an embodiment, the key processing module 1302 obtains a first intermediate key by deriving the first intermediate key based on the security context of the first communications system, the security context of the second communications system, and the third intermediate key.

In an embodiment, the first network element includes a target access and mobility management function (AMF), the second network element includes a source AMF, the target AMF is connected to the target access network device, and the source AMF is connected to the source access network device. Alternatively, the first network element includes a target SEAF, the second network element includes a source SEAF, the target SEAF is connected to the target access network device, and the source SEAF is connected to the source access network device.

In an embodiment, the network parameter includes one or more of a target side identifier, a slice identifier, a network access identifier (NAI), network slice selection assistance information (NSSAI), an AMF region identifier, an AMF setting identifier, a GUAMI, an AMF pointer, an AMF set identifier, a counter, a random number, or a sequence number.

In an embodiment, the first network element includes a mobility management entity (MME) network element in a first communications system, the target access network device is an access network device in the first communications system, and the source access network device is an access network device in a second communications system.

The key processing module 1302 receives, using the receiving module 1301, a request for handing over the user equipment from the source access network device to the target access network device to perform communication, where the request includes a security context of the second communications system.

The key processing module 1302 obtains a security key. The security key is used for protecting communication between the user equipment and the target network after the user equipment is handed over from the source access network device to the target access network device.

The sending module 1303 sends the security key to the target access network device.

In an embodiment, the MME obtains a security key by obtaining, via the key processing module 1302 using the receiving module 1301, a third intermediate key, where the third intermediate key is derived by a home subscriber server (HSS) in the first communications system based on a first ciphering key, a first integrity protection key, a serving network name identifier, and a sequence number (SQN). The third intermediate key is an upper-layer key generated after authentication in the first communications system, and is used for deriving a lower-layer access stratum key and a lower-layer non-access stratum key. Further, the MME derives, by the key processing module 1302, the security key based on a security context of the second communications system and the third intermediate key.

In an embodiment, the key processing module 1302 obtains a security key by receiving, via the key processing module 1302 using the receiving module 1301, a first intermediate key sent by an AMF in the second communications system, where the first intermediate key is an upper-layer key generated after authentication in the second communications system, and is used for deriving a lower-layer AS key and a lower-layer NAS key. Further, the key processing module 1302 derives the third intermediate key based on the first intermediate key, and derives the security key based on a security context of the second communications system and the third intermediate key.

All or some of the foregoing embodiments may be implemented using software, hardware, firmware, or any combination thereof. When implemented using software, the embodiments may be implemented completely or partially in a form of a computer program product. The computer program product includes one or more computer instructions, and when the computer program instructions are loaded and executed on a computer, some or all procedures and functions according to the embodiments of the present disclosure are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared or microwave) manner. The computer-readable storage medium may be any usable medium accessible to a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk), or the like.

In the foregoing embodiments, the description of each embodiment has respective focuses. For a part that is not described in detail in an embodiment, refer to related descriptions in other embodiments.

What is claimed is:

1. A key derivation method, comprising:
   sending, by a mobile management entity (MME) in a Long-Term evolution (LTE) system, a first path switching request to a target access mobility management function (AMF) in a fifth generation (5G) communications system, wherein the first path switching request comprises an intermediate Access Security Management Entity (ASME) key (Kasme) of the LTE system;
   obtaining, by the target AMF, an intermediate AMF key (Kamf) based on the Kasme;
   generating, by the target AMF, a security key based on the Kamf, wherein the security key comprises a non-access stratum (NAS) signaling encryption protection key, an NAS signaling integrity protection key, and a base station key (KgNB);
   sending, by the target AMF, a handover request to a base station (gNB) of the 5G communications system, wherein the handover request carries the KgNB;
   generating, by the gNB, an access stratum (AS) key based on the KgNB;
   sending, by the gNB, an acknowledgment message of the handover request to the target AMF; and
   sending, by the target AMF, a second path switching request and a security context comprising a 5G-related security protection algorithm identifier to the MME in response to the acknowledgment message.

2. The key derivation method according to claim 1, wherein the first path switching request comprises a security context of the LTE system, wherein the security context comprises a first key, and wherein obtaining the Kamf based on the Kasme comprises obtaining, by the target AMF, the Kamf based on the Kasme and the first key.

3. The key derivation method according to claim 1, wherein the first path switching request comprises a security context of the LTE system, wherein obtaining the Kamf based on the Kasme comprises obtaining, by the target AMF, the Kamf based on the Kasme, the security context, and a network parameter.

4. The key derivation method according to claim 1, wherein obtaining the Kamf based on the Kasme comprises obtaining, by the target AMF, the Kamf based on the Kasme and a network parameter.

5. A key derivation system, comprising:
   a mobile management entity (MME) configured to send a first path switching request in a fifth generation (5G) communications system, wherein the first path switching request comprises an intermediate Access Security Management Entity (ASME) key (Kasme) of a Long-Term evolution (LTE) system;
   a target access mobility management function (AMF) configured to:
   receive the first path switching request from the MIME;
   obtain an intermediate AMF key (Kamf) based on the Kasme;
   generate a security key based on the Kamf, wherein the security key comprises a non-access stratum (NAS) signaling encryption protection key, an NAS signaling integrity protection key, and a base station key (KgNB);
   send a handover request;
   receive an acknowledgment message acknowledging the handover request; and
   send a second path switching request and a security context comprising a 5G-related security protection algorithm identifier to the MME in response to the acknowledgment message, and
   a base station (gNB) configured to:
   receive the handover request from the target AMF, wherein the handover the request carries the KgNB;
   generate an access stratum (AS) key based on the KgNB; and
   send the acknowledgment message to the target AMF.

6. The system according to claim 5, wherein the first path switching request comprises a security context of the LTE system, wherein the security context comprises a first key, and wherein the target AMF is further configured to obtain the Kamf based on the Kasme and the first key.

7. The system according to claim 5, wherein the first path switching request comprises a security context of the LTE system, and wherein the target AMF is further configured to obtain the Kamf based on the Kasme, the security context, and a network parameter.

8. The key derivation method according to claim 2, wherein the security context comprises a first key.

9. The key derivation method according to claim 8, wherein obtaining the Kamf based on the Kasme comprises obtaining, by the target AMF, the Kamf based on the Kasme and the first key.

10. The key derivation method according to claim 3, wherein obtaining the Kamf based on the Kasme comprises obtaining, by the target AMF, the Kamf based on the Kasme, the security context, and a network parameter.

11. The key derivation method according to claim 10, wherein the network parameter includes one or more of a slice identifier, a network access identifier (NAI), or network slice selection assistance information (NSSAI).

12. The key derivation method according to claim 10, wherein the network parameter includes one or more of an AMF region identifier, an AMF setting identifier, a globally unique AMF identifier (GUAMI), an AMF pointer, or an AMF set identifier.

13. The key derivation method according to claim 10, wherein the network parameter includes one or more of a count value Nonce, a counter, a random number, or a sequence number.

14. The key derivation method according to claim 1, wherein the 5G-related security protection algorithm identifier identifies a 5G NAS algorithm.

15. The system according to claim 6, wherein the security context comprises a first key.

16. The system according to claim 15, wherein the target AMF is further configured to obtain the Kamf based on the Kasme and the first key.

17. The system according to claim 7, wherein the target AMF is further configured to obtain the Kamf based on the Kasme, the security context, and a network parameter.

18. The system according to claim 17, wherein the network parameter includes one or more of a slice identifier, a network access identifier (NAI), or network slice selection assistance information (NSSAI).

19. The system according to claim 17, wherein the network parameter includes one or more of an AMF region identifier, an AMF setting identifier, a globally unique AMF identifier (GUAMI), an AMF pointer, or an AMF set identifier.

20. The system according to claim 17, wherein the network parameter includes one or more of a count value Nonce, a counter, a random number, or a sequence number.

* * * * *